(12) United States Patent
Barnes et al.

(10) Patent No.: US 8,967,634 B2
(45) Date of Patent: Mar. 3, 2015

(54) ARTICLE TRANSPORT VEHICLES AND METHODS OF TRANSPORTING ARTICLES

(76) Inventors: Arthur Wayne Barnes, Otis Orchards, WA (US); Vance Vernon Kinchen, Post Falls, ID (US); Todd Earl Gregg, Spokane, WA (US)

( * ) Notice: Subject to any disclaimer, the term of this patent is extended or adjusted under 35 U.S.C. 154(b) by 548 days.

(21) Appl. No.: 12/822,973

(22) Filed: Jun. 24, 2010
(Under 37 CFR 1.47)

(65) Prior Publication Data
US 2011/0318149 A1    Dec. 29, 2011

(51) Int. Cl.
*B62B 3/12* (2006.01)
*B62B 1/14* (2006.01)
*B62B 3/02* (2006.01)
*B62B 3/04* (2006.01)

(52) U.S. Cl.
CPC . *B62B 1/142* (2013.01); *B62B 3/02* (2013.01); *B62B 3/04* (2013.01); *B62B 3/12* (2013.01); *B62B 2202/022* (2013.01); *B62B 2203/10* (2013.01)
USPC .................. 280/47.29; 280/43.11; 280/43.17; 280/62

(58) Field of Classification Search
CPC .................. B62B 2202/021; B62B 2202/022; B62B 2203/10; B62B 3/104; B62B 1/264; B66F 9/06; B66F 19/00
USPC ............... 280/47.24, 47.26, 47.27, 47.29, 43, 280/43.1, 43.11, 43.17, 62, 63, 64; 414/454, 490, 469; 16/32
See application file for complete search history.

(56) References Cited

U.S. PATENT DOCUMENTS

| | | | | |
|---|---|---|---|---|
| 2,450,690 | A * | 10/1948 | Robins | 414/458 |
| 2,598,489 | A * | 5/1952 | Bayer et al. | 414/467 |
| 2,612,386 | A * | 9/1952 | Schutzer et al. | 280/43.24 |
| 4,417,738 | A * | 11/1983 | Kendall | 280/43.17 |
| 4,625,949 | A * | 12/1986 | Walker | 266/48 |
| 5,393,080 | A | 2/1995 | Ross | |
| 5,405,235 | A * | 4/1995 | Lebre et al. | 414/490 |
| 5,417,541 | A * | 5/1995 | Herron | 414/592 |
| 5,464,234 | A | 11/1995 | Ferguson | |
| 5,489,183 | A * | 2/1996 | Malden et al. | 414/490 |
| 5,772,193 | A | 6/1998 | Dykstra | |
| 5,873,500 | A | 2/1999 | Homburg et al. | |
| 5,904,349 | A | 5/1999 | Dykstra | |
| 6,109,625 | A * | 8/2000 | Hewitt | 280/43.24 |
| 6,119,475 | A | 9/2000 | Murray et al. | |
| 6,406,248 | B1 * | 6/2002 | McGill et al. | 414/634 |
| D473,989 | S | 4/2003 | Hittle | |
| D473,990 | S | 4/2003 | Hittle | |
| 6,682,084 | B2 * | 1/2004 | Webster et al. | 280/79.5 |
| 6,783,147 | B1 * | 8/2004 | Green, Sr. | 280/652 |
| 6,843,625 | B2 * | 1/2005 | Hewitt | 410/66 |
| 6,863,198 | B1 | 3/2005 | Darby | |
| 6,997,466 | B2 * | 2/2006 | Wang | 280/43.17 |
| 7,118,500 | B2 * | 10/2006 | Nye et al. | 473/481 |
| 7,273,216 | B1 * | 9/2007 | Hohrman | 280/79.5 |
| 7,384,050 | B2 | 6/2008 | Blum et al. | |

(Continued)

Primary Examiner — John Walters
Assistant Examiner — Brian Swenson
(74) Attorney, Agent, or Firm — Wells St. John P.S.

(57) ABSTRACT

An article transport vehicle including a frame and at least one wheel supporting the frame on a substrate. The vehicle further includes a support surface extending outwardly from the frame and a lift device secured to the support surface. The lift device is capable of axial movement at an angle relative to the support surface to selectively establish a raised position or lowered position of the support surface relative the substrate.

11 Claims, 22 Drawing Sheets

(56) References Cited

U.S. PATENT DOCUMENTS

| | | |
|---|---|---|
| 7,438,084 B2 | 10/2008 | Trettin et al. |
| 7,478,704 B2 | 1/2009 | Church |
| 7,824,144 B2 * | 11/2010 | Wilson .......................... 414/421 |
| 8,172,241 B2 * | 5/2012 | Salvucci, Jr. ................ 280/47.26 |
| 8,262,108 B2 * | 9/2012 | Al-Hasan ................. 280/47.371 |
| 2009/0285659 A1 * | 11/2009 | Wilson ........................... 414/444 |
| 2010/0021275 A1 * | 1/2010 | Ratermann ................... 414/454 |

* cited by examiner

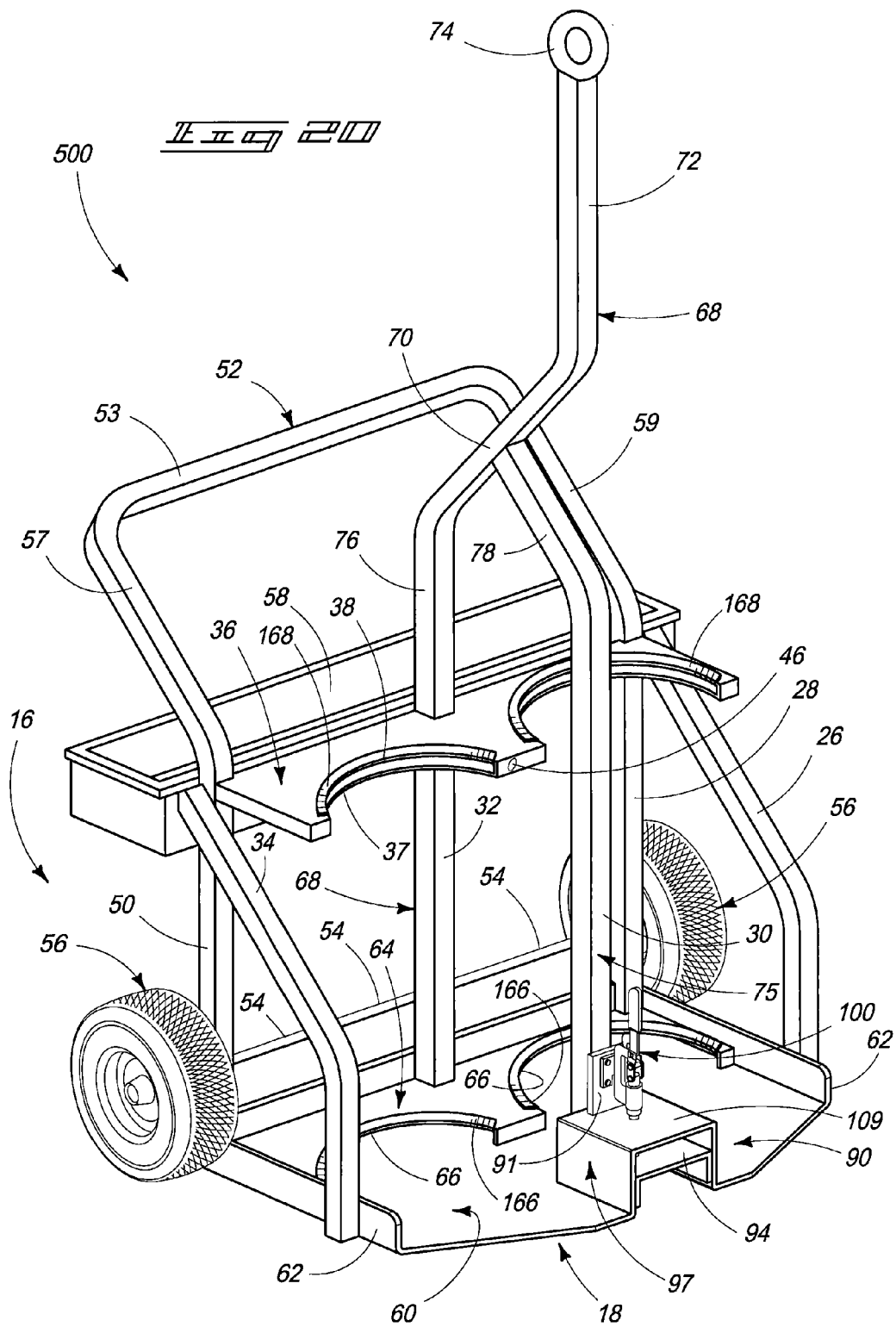

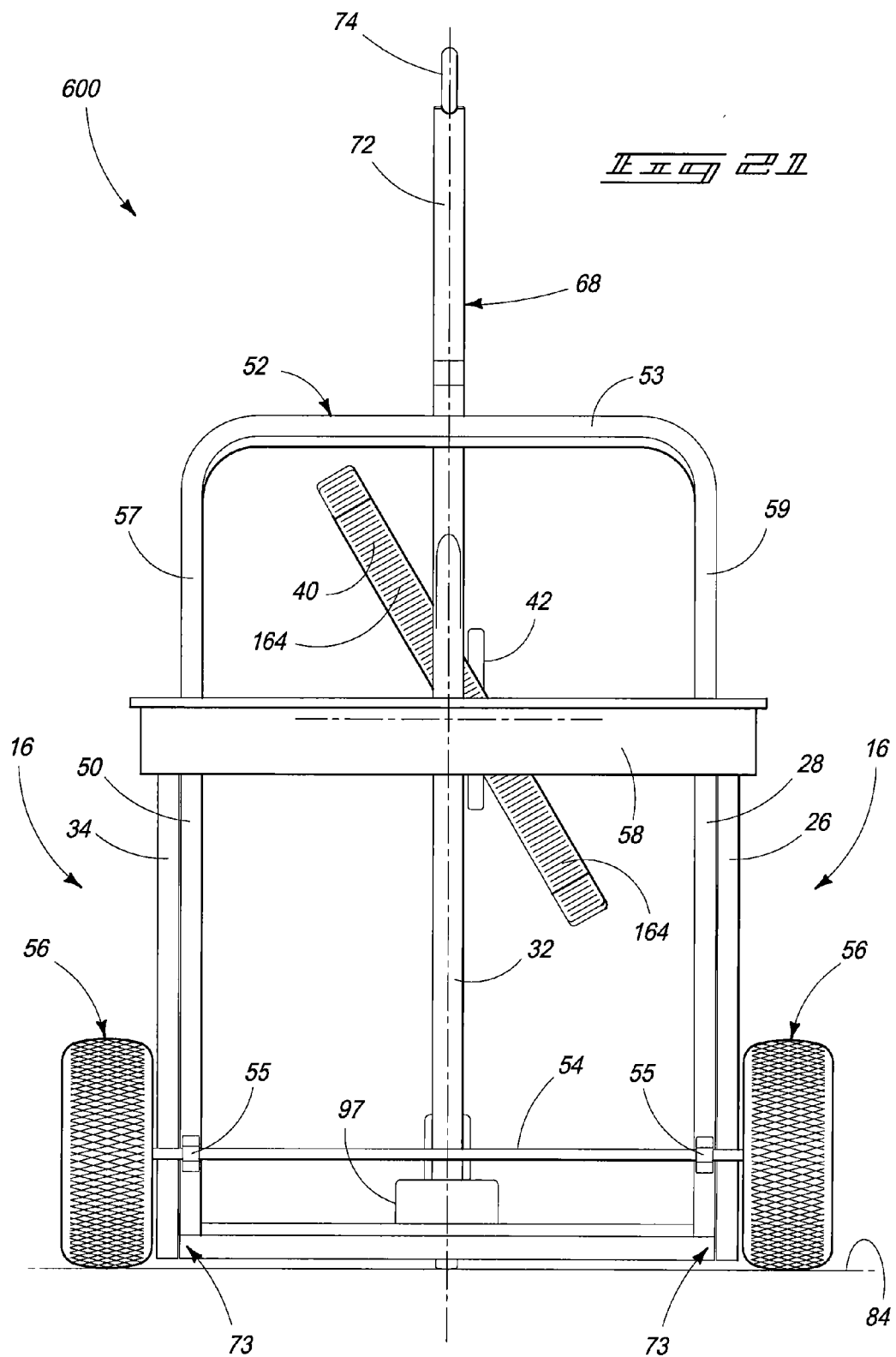

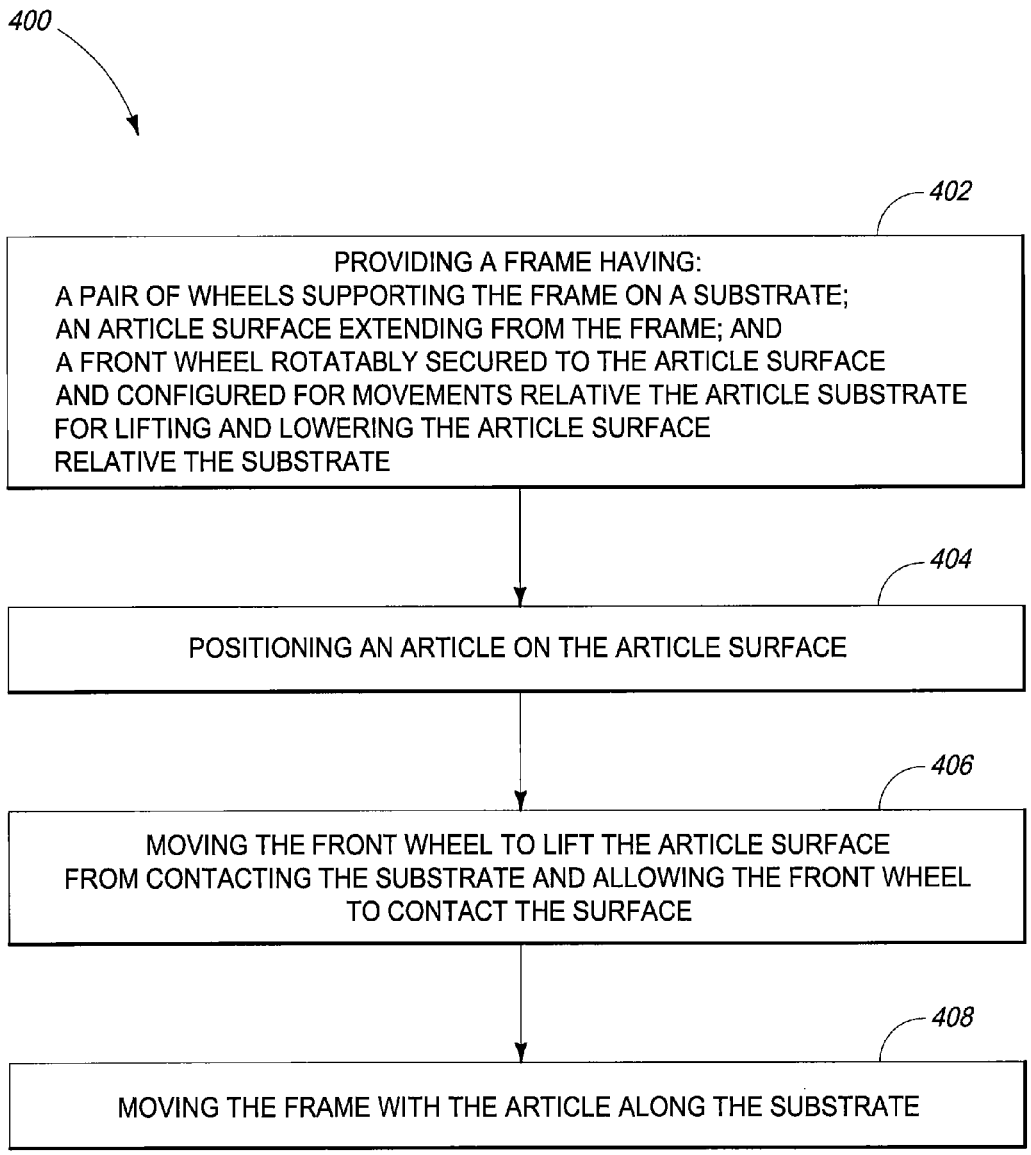

ARTICLE TRANSPORT VEHICLES AND METHODS OF TRANSPORTING ARTICLES

CROSS REFERENCE TO RELATED APPLICATION

This application does not claim priority from any other application.

TECHNICAL FIELD

This invention relates to article transport vehicles and methods of transporting articles.

BACKGROUND OF THE INVENTION

Exemplary article transport vehicles include various configurations such as utility carts, dollies, hand carts, hand trucks, lawn carts, garden carts and wheelbarrows. There is always a need to provide new designs and configurations that increase efficiency, mechanical advantage and ease of use for article transport vehicles to increase the number of articles capable of being transported by individuals. For example, increasing the efficiency, mechanical advantage and ease of use for article transport vehicles will increase the loads provided by articles that people can transport and deliver safely and efficiently.

BRIEF DESCRIPTION OF THE DRAWINGS

Preferred embodiments of the invention are described below with reference to the following accompanying drawings.

FIG. 20 is a perspective view of still another exemplary article transport vehicle according to another of various embodiments of the invention.

FIG. 21 is an elevational back view of yet another exemplary article transport vehicle according to yet another of various embodiments of the invention.

FIG. 22 is an exemplary method of transporting an article by using an exemplary article transport vehicle according to one of various embodiments of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
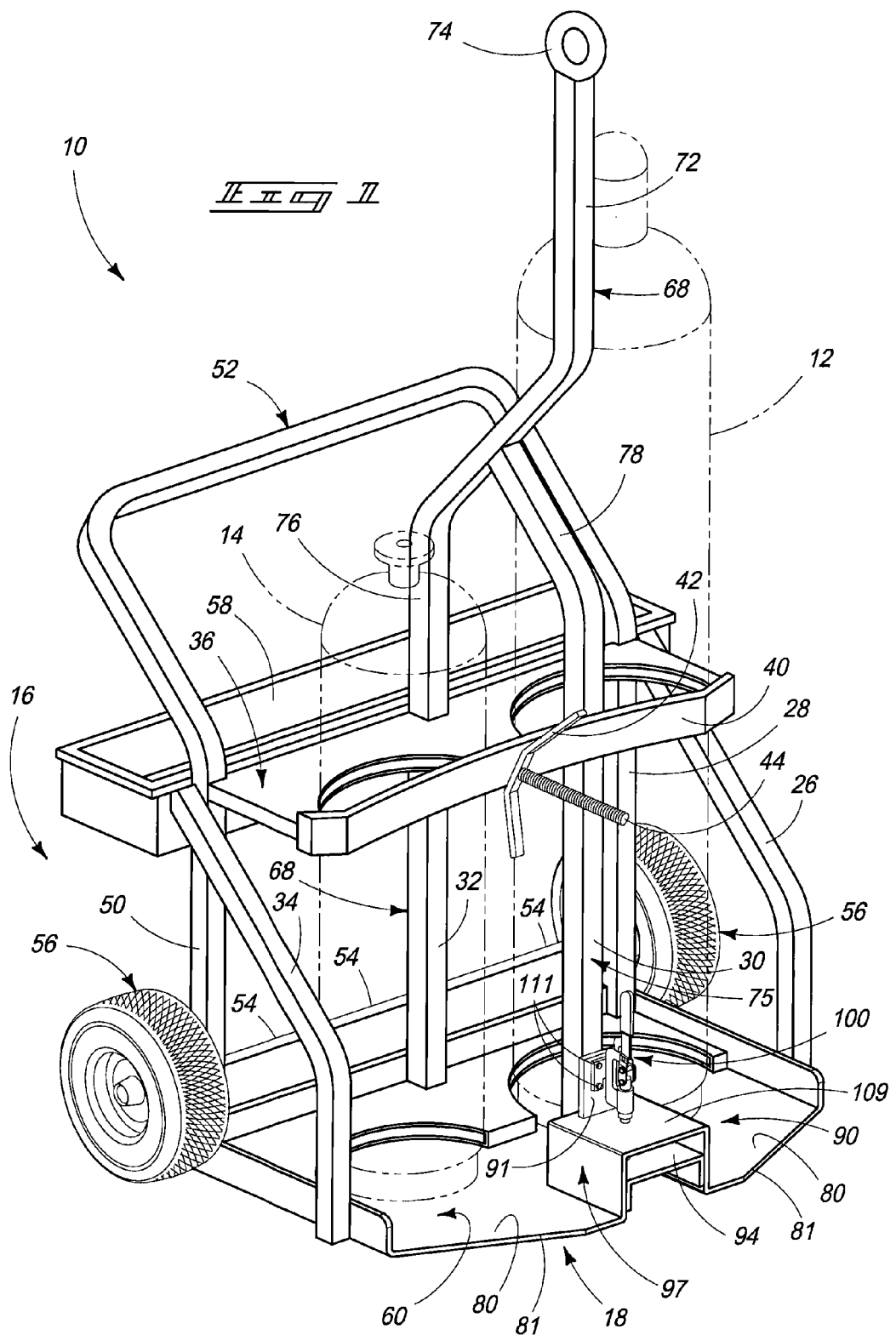
FIG. 1 is a perspective view of an exemplary article transport vehicle according to one of various embodiments of the invention and illustrated in use according to one of various embodiments of the invention.

Referring to FIG. 1, an exemplary article transport vehicle 10 (hereinafter referred to as "vehicle(s)") is illustrated according to one of various embodiments of the invention. The exemplary vehicle 10 is illustrated with at least one exemplary article (or cargo) for transport and ultimate delivery to one of various locations. Exemplary articles (or cargo) include fluid tanks 12 and 14 of various sizes and configurations. One exemplary vehicle 10 includes: a frame 16; at least one wheel to support the frame 16 on a substrate 84, and in this embodiment, a pair of wheels 56 rotatably secured to opposite sides of frame 16; a support surface (article surface or article receiving surface) 18 that extends outwardly from a lower portion of the frame 16; and a lift or pivot device 90 that includes an elongated structure 107 that slidingly engages the support surface 18 for reciprocal movement between at least two positions, a first position (referred to as an extended position explained subsequently) and a second position (referred to as a retracted position explained subsequently).

Figure 2:
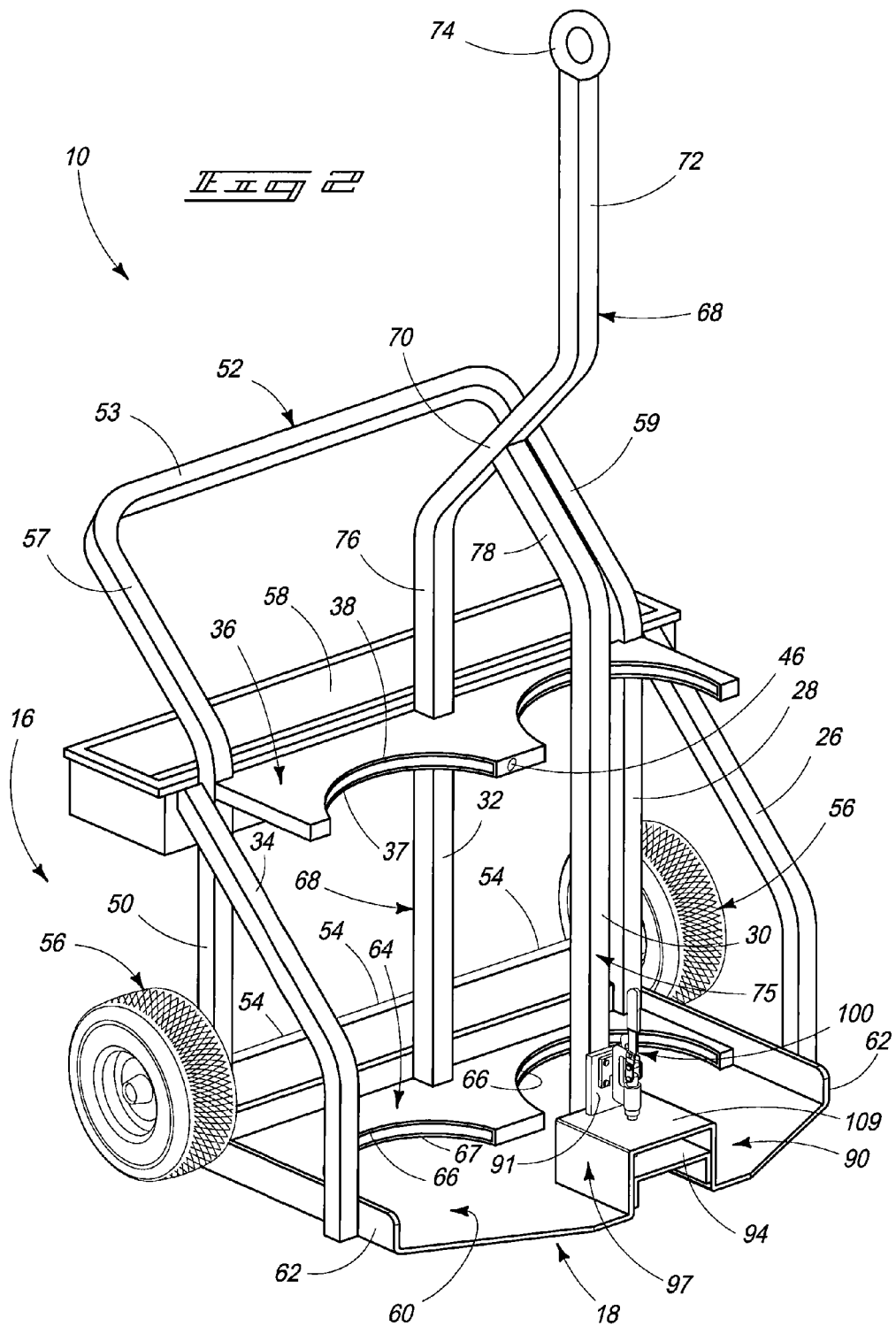
FIG. 2 is the perspective view of the exemplary article transport vehicle of FIG. 1 with the tanks and some components removed.

Referring to FIGS. 1 and 2, exemplary embodiments of vehicle 10 are more thoroughly described. An exemplary support surface 18 (also referred to as "floor" or "receiving surface") includes a generally planar upper surface 60 to receive articles. In this exemplary embodiment, support surface 18 includes three periphery edges having containment ridges 62 extending generally vertically and perpendicularly from periphery edges of the support surface 18. Two containment ridges 62 extend from opposite periphery edges located at opposite sides of support surface 18. The third containment ridge 62 extends from the rearmost periphery edge of support surface 18 and connects the other two containment ridges 62 at two opposite corners 73 (see FIG. 6). A front portion 80 of support surface 18 has a front periphery edge 81 that is devoid of a containment ridge to facilitate receipt of the article or articles for transport and delivery. Other embodiments of vehicle 10 include having only one containment ridge 62 in any of the three locations, or having only two containment ridges 62 in any combination of the three locations, and alternatively vehicle 10 has no containment ridges.

Still referring to FIGS. 1 and 2, a lower article brace (or lower retaining nest) 64 extends from the rearmost containment ridges 62, over a portion of support surface 18, and between the two side containment ridges 62. An exemplary embodiment of lower article brace 64 includes an upper guidance plate 66 spaced over a lower guidance plate 67 with each plate 66 and 67 having substantially the same geometric configurations. In this embodiment, the geometric configurations include front edges of respective plates 66 and 67 forming two concave configurations of different radius dimensions and laterally spaced from each other. The concave configurations facilitate receipt and support of articles with circular outer peripheries such as fluid tanks have different circumferential dimensions.

Still referring to FIGS. 1 and 2, other exemplary embodiments of vehicle 10 will include other geometric configurations for lower article braces such as squares, rectangles, hexagons, octagons and any other polygonal shape, and alternatively any non-polygonal shape to accommodate the articles to be delivered and transported. Exemplary spacing dimensions between respective plates 66 and 67 include a range of from about 0.5 inches to about 24 inches and every 0.1 of an inch dimension in between. Moreover, exemplary spacing dimensions between support surface 18 and lower guidance plate 67 include a range of from about 0.0 inches (contact between support surface 18 and lower guidance plate 67) to about 12 inches and every 0.1 of an inch dimension in between. It should be understood that alternative embodiments of vehicle 10 include being devoid of a lower article brace 64.

Figure 3:
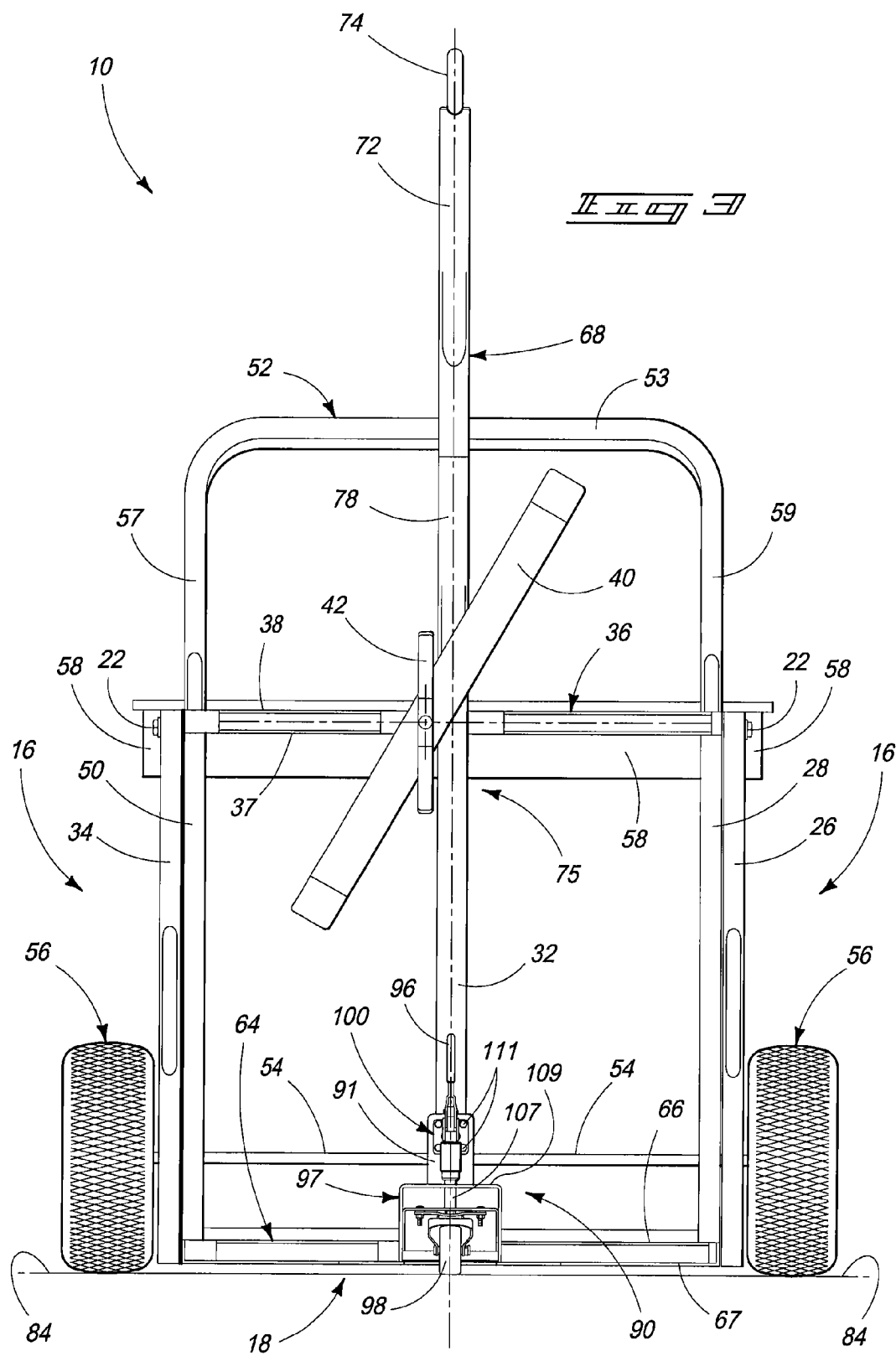
FIG. 3 is a elevational front view of the exemplary article transport vehicle of FIG. 1.

Referring to FIGS. 1-3, an exemplary vehicle 10 includes a frame or body structure 16 that extends upwardly from the support surface 18. An exemplary frame 16 includes at least one elongated structure that extends upward from the support surface 18 and terminates into a handle for gripping. In the embodiment shown, frame 16 includes a plurality of tubular frame structures 26, 28, 34 and 50 extending upward from the support surface 18. Tubular frame structures 28 and 50 are a pair of substantially straight or linear structures that extend from an inside of the two corners 73 of containment ridges 62 and extend generally perpendicularly from support surface 18.

In one embodiment of vehicle 10, a handle structure 52 extends as a continuous and integral tubular structure between respective tubular frame structures 28 and 50. That is, handle structure 52 includes: two separate curved portions (not referenced) extending from respective tubular frame structures 28 and 50, two linear extensions 57 and 59 extending from the curved portions, and a crossbeam 53 extending between the two linear extensions 57 and 59 and connected together by two additional curved portions (not referenced). Crossbeam 53 will act as a grip for manual manipulation of vehicle 10.

Still referring to FIGS. 1-3, in another embodiment of the vehicle 10, handle structure 52 is a separate and discrete component (not shown) that is secured to frame 16. In still another exemplary vehicle 10, handle structure 52 is a separate and discrete component that is pivotably secured to frame 16 (not shown) with the capability of selective incremental elevational adjustments upward or downward relative frame 16. The selective incremental elevational adjustments facilitate the use of vehicle 10 having different dimensions or heights. Additionally, the selective incremental elevational adjustments facilitate the use of vehicle 10 by individuals with different heights. With the pivoting handle structure 52 embodiment, vehicle 10 will include an affixing device (not shown) (for example, aligned openings with a pin positioned therein) that will maintain and affix handle structure 52 in the incremental elevational positions selected. It should be understood that handle structure 52 can include a rubber or plastic covering (not shown) to facilitate gripping, handling and maneuvering vehicle 10 by an individual's hands. An exemplary covering can include finger grooves to increase finger placement and static placement of hands on the handle structure 52. Moreover, in still other embodiments of vehicle 10, handle structure 52 will be two separate and discrete handle structures, one each extending from respective tubular frame structures 28 and 50.

Still referring to FIGS. 1-3, the exemplary frame 16 further includes tubular frame structures 26 and 34 each having first portions located in spaced relation forward of respective tubular frame structures 28 and 50. Tubular frame structures 26 and 34 extend from outside of opposite side containment ridges 62. The first (lowest) portions (not referenced) of tubular structures 26 and 34 extend generally perpendicularly relative support surface 18 and continue with second portions (not referenced) angled backward to terminate adjacent outside of respective tubular frame structures 28 and 50 below curved portions of handle structure 52. Tubular structures 26 and 34 increase integrity and stability of vehicle 10 between frame 16 and support surface 18 when under stress of carrying or supporting articles.

Figure 4:
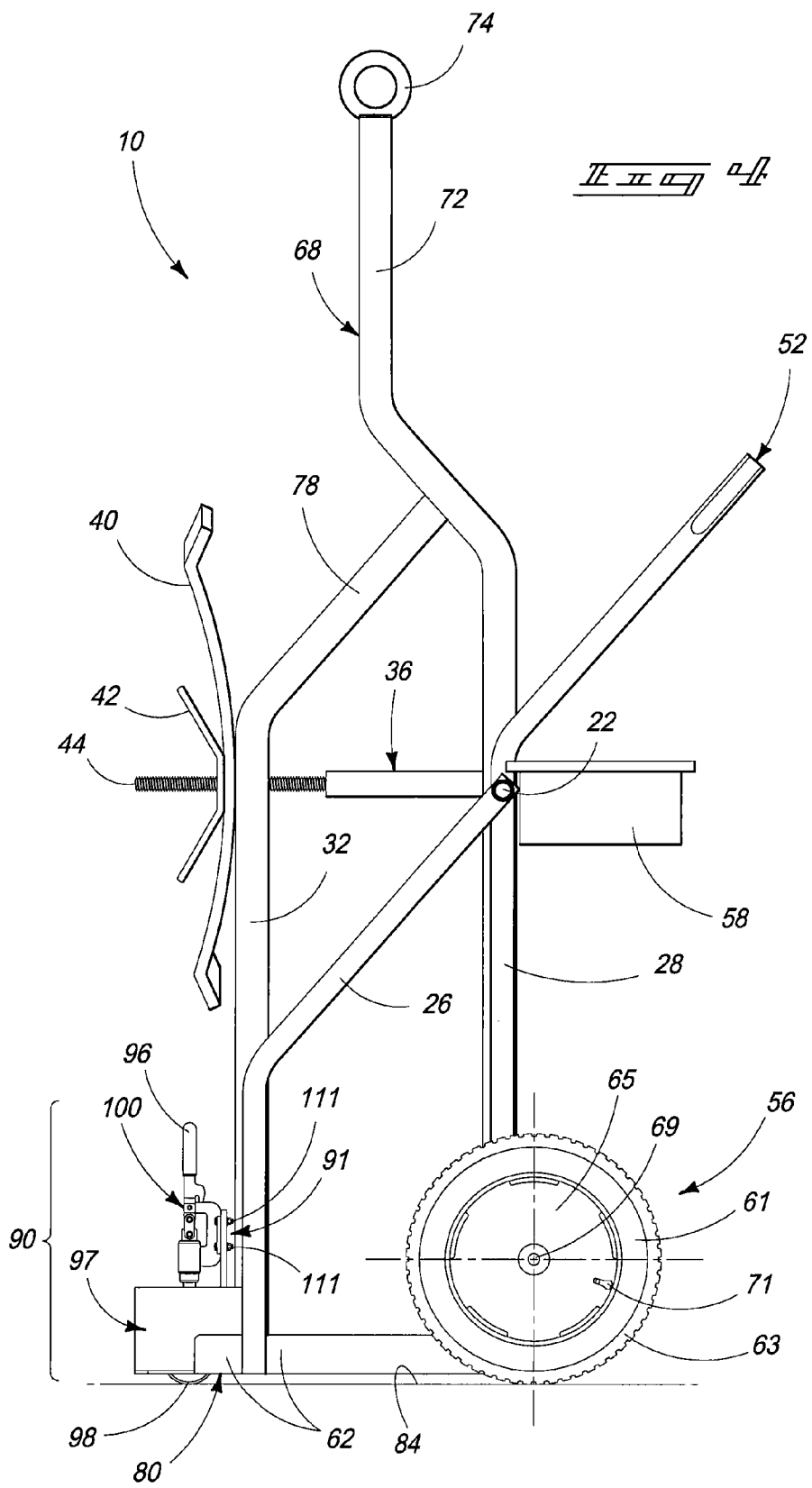
FIG. 4 is the elevational side view of the exemplary article transport vehicle of FIG. 1 and illustrated at a stage of use according to one of various embodiments of the invention.
Figure 6:
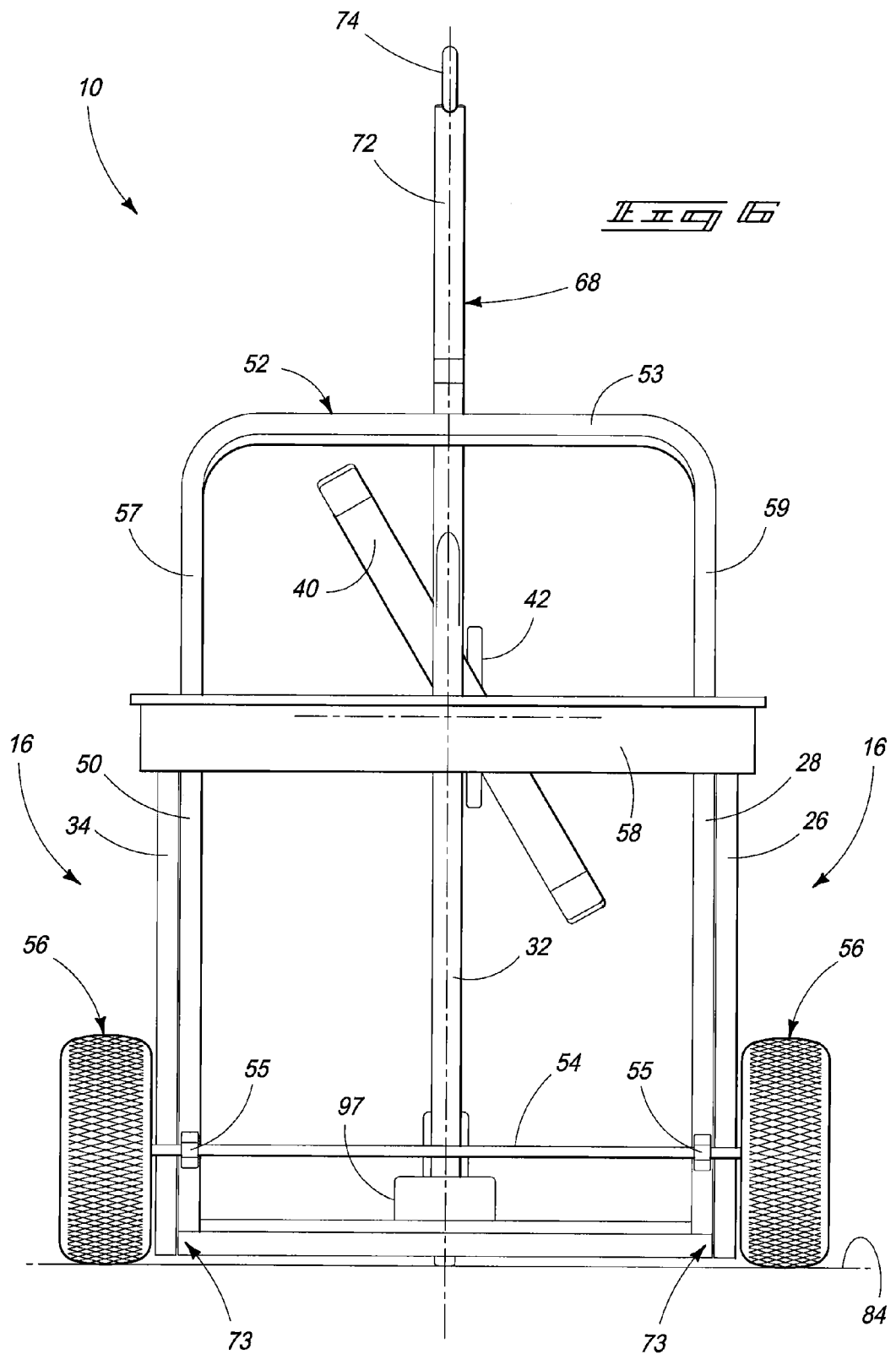
FIG. 6 is a elevational back view of the exemplary article transport vehicle of FIG. 1.

Referring to FIGS. 1-4 and 6, an exemplary vehicle 10 has a pair of wheels 56 proximate opposite corners 73. Referring to FIG. 6, an axle 54 extends between wheels 56 and is rotatably secured to the backsides of respective tubular frame structures 28 and 50 by brackets 55. Referring to FIG. 4, an exemplary side view of wheel 56 is illustrated and includes: axle end cover 69 over ends of axle 54, hub and rim 65 secured to axle 54, a tire 61 over hub and rim 65, and tread structures 63 over an outer cylindrical portion of tire 61. In one embodiment of vehicle 10, tires 61 are inflatable, and therefore, include an air stem 71. Other embodiments of vehicle 10 include tires 61 that are not inflatable. Still other embodiments of vehicle 10, an axle is not included wherein each wheel 56 is independently rotatably secured to respective tubular frame structures 28 and 50. Yet other embodiments of vehicles 10 can include dampening devices such as shock absorbers and/or springs (coil or leaf) (not shown) which provide dampening effects between wheels 56 and frame 16. Still other embodiments of vehicles 10 can include pivoting or swiveling devices (not shown) to permit steering capabilities of the wheels 56 upon angling the movement of vehicle 10 from a straight line.

Again referring to FIGS. 1-3, an exemplary embodiment of vehicle 10 includes a receptacle or tray 58 secured to respective tubular frame structures 28 and 50. An exemplary tray 58 is a rectangular box devoid of a top cover allowing access and with an uppermost portion of tray 58 being located below or at the curved portion of handle structure 52. The exemplary tray 58 extends rearward from and is secured to frame 16, or/and secured to handle structure 52. Alternatively, tray 58 is secured to a terminal end of respective tubular frame structures 26 and 34. An exemplary depth of tray 58 can be from about an inch to several feet, for example, a range of depths that include from about 1 inch to about 36 inches. It should be understood that some exemplary embodiments of vehicle 10 include a tray 58 having a top cover or lid (not shown) that articulates with a pivoting structure, for example, a hinge which provides opening and closing capabilities of tray 58.

Again referring to FIGS. 1-2, an exemplary vehicle 10 includes an attachment device (also referred to as an eye hook, tongue or hitch) 68 configured to provide the capability to lift (or raise), and alternatively lower, vehicle 10 with a crane (not shown) or forklift (not shown). An exemplary reason for lifting vehicle 10 off the ground is for storage and/or security reasons to prevent theft of vehicle 10 while at outdoor work sites. An exemplary attachment device 68 is a tubular structure extending from the support surface 18 (and the lower article brace 64) and positioned between tubular frame structures 28 and 50. The exemplary attachment device 68 includes a first portion 32 extending generally perpendicularly from the support surface 18, a second portion 70 extending from, and angled forward from, the first portion 32, and a third portion 72 extending from, and angled upward from the second portion 70. An eyelet 74 is secured to a terminal end of the third portion 72. In this exemplary embodiment of attachment device 68, the third portion 72 is spaced forward from, generally parallel with, and elevationally above the first portion 32.

Again referring to FIGS. 1-2, an exemplary vehicle 10 includes a stabilizer bar 75 configured to provide integrity and stability to the attachment device 68 and the support surface 18. An exemplary stabilizer bar 75 is a tubular structure extending from the support surface 18 forward of the attachment device 68. The exemplary stabilizer bar 75 includes a first portion 30 extending generally perpendicularly from the support surface 18 and a second portion 78 extending from, and angled rearward from, the first portion 30. The second portion 78 has a terminal end secured to the second portion 70 of the attachment device 68. An exemplary securement method between the second portion 78 and the second portion 70 is via welding.

Again referring to FIGS. 1-2, an exemplary vehicle 10 includes an upper article brace (or upper retaining nest) 36 that extends between, and is secured to, respective tubular frame structures 28 and 50 below the two curved portions of handle structure 52. Accordingly, the exemplary embodiment of upper article brace 36 is spaced elevationally above and generally parallel to the lower article brace 64. In this exemplary embodiment of vehicle 10, upper article brace 36 is geometrically configured the same as lower article brace 64, and therefore, includes an upper guidance plate 38 spaced over a lower guidance plate 37 with each front edges of respective plates 66 and 67 forming two concave configurations of different radius dimensions. Moreover, the geometric configuration of upper article brace 36 is aligned over the geometric configuration of lower article brace 64. Other exemplary embodiments of vehicle 10 will include other geometric configurations for upper article braces 36 such as squares, rectangles, hexagons, octagons and any other polygonal shape, and alternatively any non-polygonal shape to accommodate the articles to be delivered and transported. For one exemplary embodiment of vehicle 10, a covering (not shown) is provided over at least one of respective plates 37 and 38 of upper article brace 36, and alternatively, an exemplary covering is provided over both respective plates 37 and 38. The covering will protect the article from damage while being positioned against the upper article brace 36. It should be understood that alternative embodiments of vehicle 10 include being devoid of a upper article brace 36.

Exemplary spacing dimensions between respective plates 37 and 38 of upper guidance plate 36 include a range of from about 0.5 inches to about 24 inches and every 0.1 of any inch dimension in between. Moreover, exemplary spacing dimensions between upper article brace 36 and lower article brace 64 include a range of from about 12.0 inches to about 36.0 inches and any 1.0 inch dimension in between. It should be understood that alternative embodiments of vehicle 10 include being devoid of an upper article brace 36. Referring to FIG. 2, one exemplary embodiment of vehicle 10 includes upper article brace 36 having a central front connection between plates 37 and 38 that has an opening 46 to receive a threaded rod 44 (FIG. 1). In one embodiment, opening 46 has internal threads to receive threaded rod 44. Alternatively, a portion of threaded rod 44 is secured in opening 46 without threads, for example, secured via welding.

Referring to FIG. 1, threaded rod 44 extends from opening 46 (FIG. 2) of upper article brace 36. In one embodiment of vehicle 10, a locking bracket (or retaining bar) 40 is positioned over threaded rod 44 and a wing nut 42 is threaded on threaded rod 44 after the locking bracket 40. Locking bracket 40 secures and locks an article (or cargo), for example, tanks 12 and/or 14 against upper article brace 36. It should be understood that wing nut 42 can be reciprocally rotated in direction 43 (FIG. 8) to loosen, and alternatively tighten. When tightening wing nut 42, the wing nut 42 moves along threaded rod 44 to abut against locking bracket 40 to drive locking bracket 40 along threaded rod 44 toward upper article brace 36. If tanks 12 and/or 14 are in place between locking bracket 40 and upper article brace 36, tightening wing nut 42 will drive locking bracket 40 to abut against tanks 12 and/or 14 and drive tanks 12 and/or 14 against upper article brace 36. In this manner, tightening wing nut 42 will tighten and lock wing nut 42 against locking bracket 40 which tightens and locks locking bracket 40 against tanks 12 and/or 14 which tightens and locks tanks 12 and/or 14 against upper article brace 36.

Referring to FIG. 3, an exemplary lift device 90 secured to the front portion of the support surface 18 and is centrally located in front or forward of the stabilizer bar 75. Generally, an exemplary lift device 90 includes a lever 96 secured to linkage 100, the linkage is secured to the elongated plunger 107, and the plunger 107 is secured to a front wheel 98. A housing 97 is secured to the support surface 18 and covers the front wheel 98. Alternatively, housing 97 is secured to stabilizer bar 75 alone, or in combination with support surface 18. An exemplary housing 97 includes a top portion 109 which receives the elongated plunger 107 in sliding engagement along axial movement through the top portion 109. One exemplary embodiment of front wheel 98 includes a swivel wheel wherein the front wheel 98 swivels or rotates around the longitudinal axis defined by elongated plunger 107. In another embodiment, the front wheel 98 does not swivel and is maintained in the alignment shown. For an exemplary embodiment of lift device 90, a vertical plate 91 extends from housing 97 and a portion of linkage 100 is secured to vertical plate 91 with bolts/nuts combination 111. In another embodiment of vehicle 10, a portion of linkage 100 is secured to stabilizer bar 75. An exemplary function of the lift device 90 is to provide the reciprocal, axial movement of the front wheel 98 relative to the support surface 18 to ultimately, and selectively, lift (raise) and lower the front portion 80 of the support surface 18 relative the substrate 84.

Referring to FIG. 4, the exemplary lift device 90 is illustrated in an extended position. An exemplary extended position has the lever 96 upright and the front wheel 98 extended relative the support surface 18 to contact the substrate 84 and force or drive (lift or raise) the front portion 80 of the support surface 18 upward in a lifted position relative the substrate 84 (that is, the front portion 80 is in a spaced relation to the substrate 84). Linkage 100 provides for the front wheel 98 to be locked in the extended position.

Figure 5:
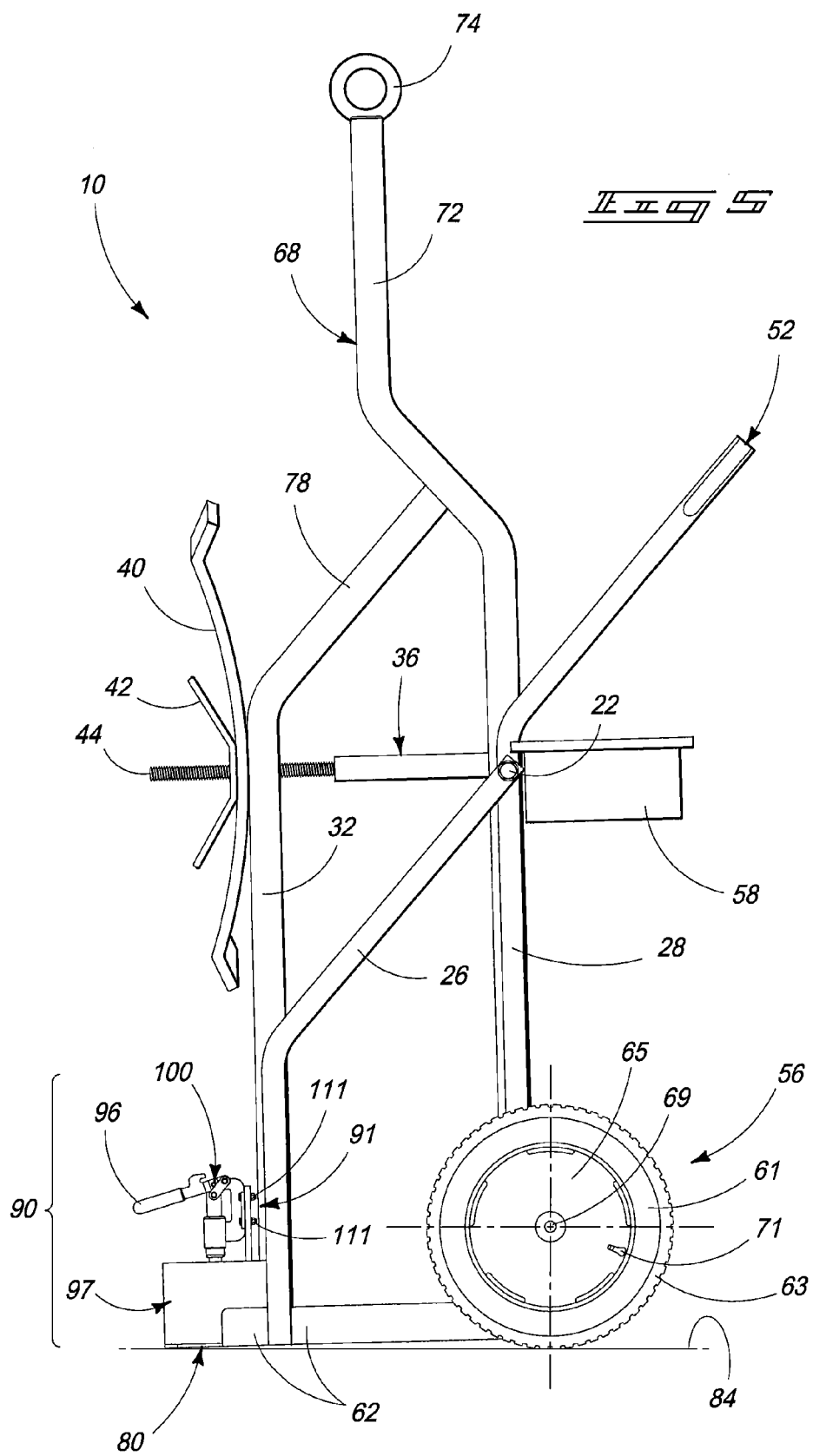
FIG. 5 is the elevational side view of the exemplary article transport vehicle of FIG. 4 and illustrated at another stage of use according to one of various embodiments of the invention.

Referring to FIG. 5, the exemplary lift device 90 is illustrated in a retracted position. An exemplary retracted position has the lever 96 extending generally slightly over 90 degrees from extended position. Moreover, the retracted position has the front wheel 98 retracted relative the support surface 18 to allow the front portion 80 to move toward the substrate 84 until the front portion 80 rests upon the substrate 84 (that is, the front portion 80 is against the substrate 84). Linkage 100 provides for the front wheel 98 to be locked in the retracted position.

Figure 7:
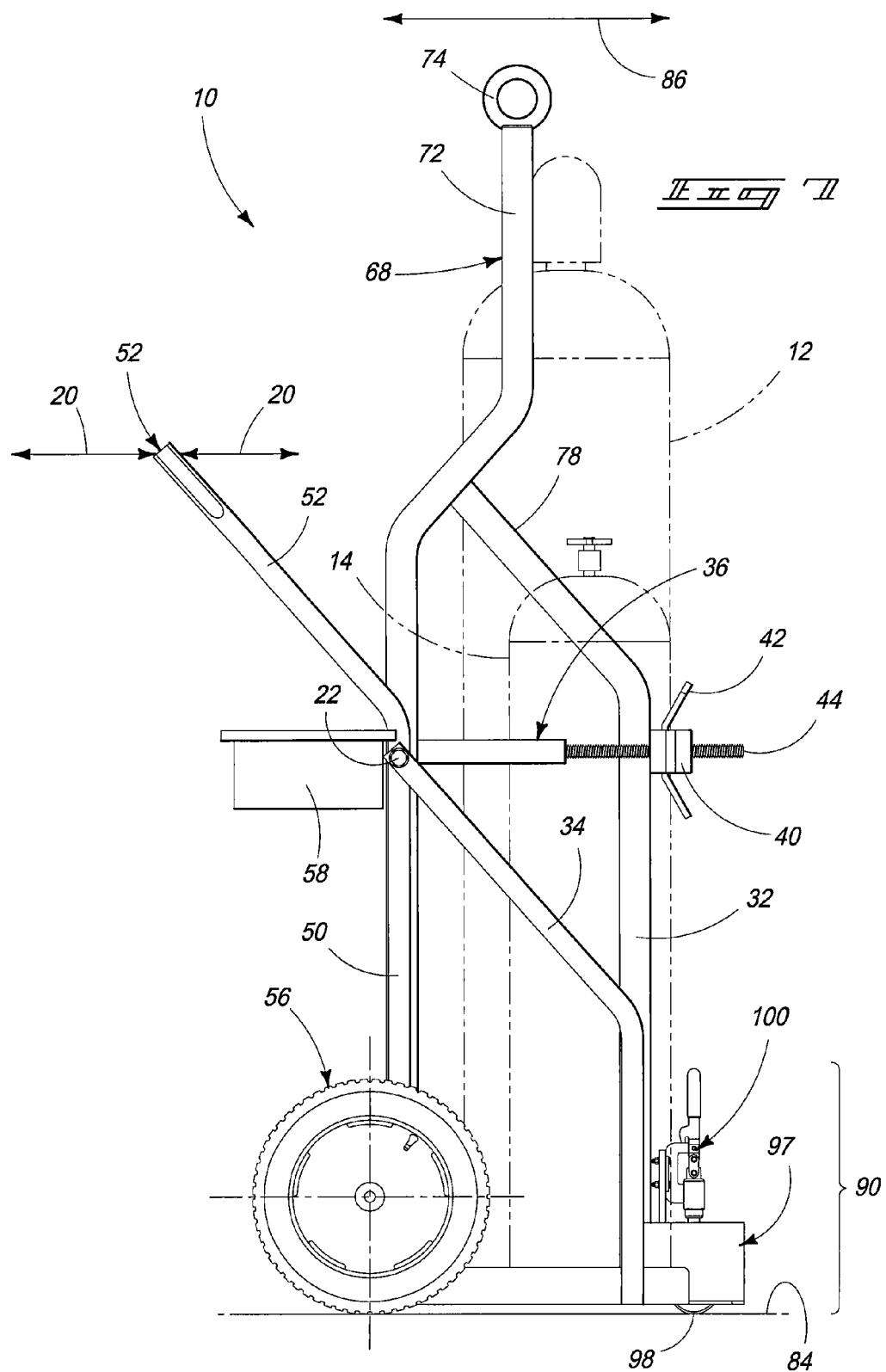
FIG. 7 is a elevational side view of the exemplary article transport vehicle of FIG. 1 and illustrated at still another stage of use according to one of various embodiments of the invention.
Figure 8:
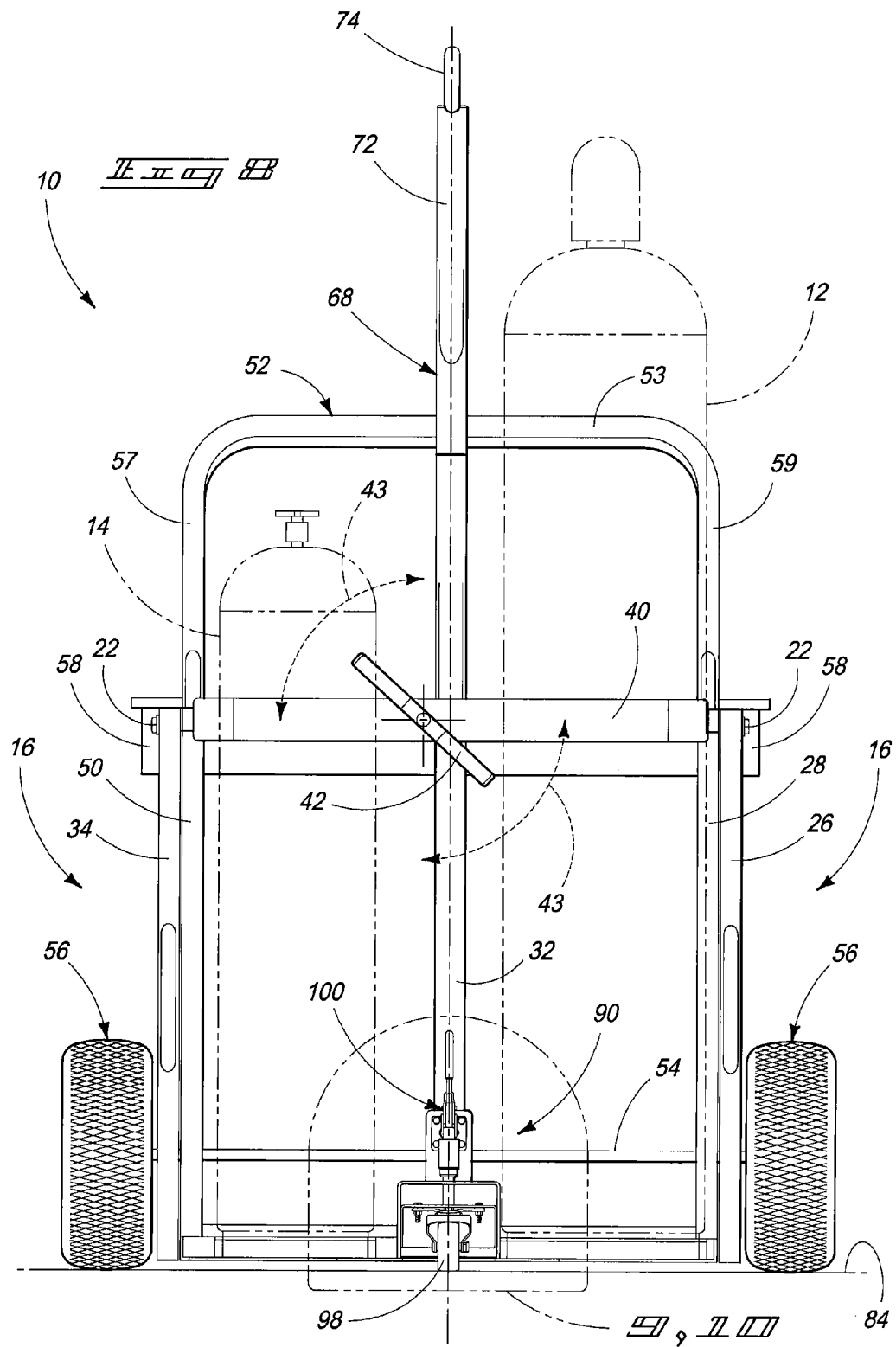
FIG. 8 is a elevational front view of the exemplary article transport vehicle of FIG. 7.
Figure 9:
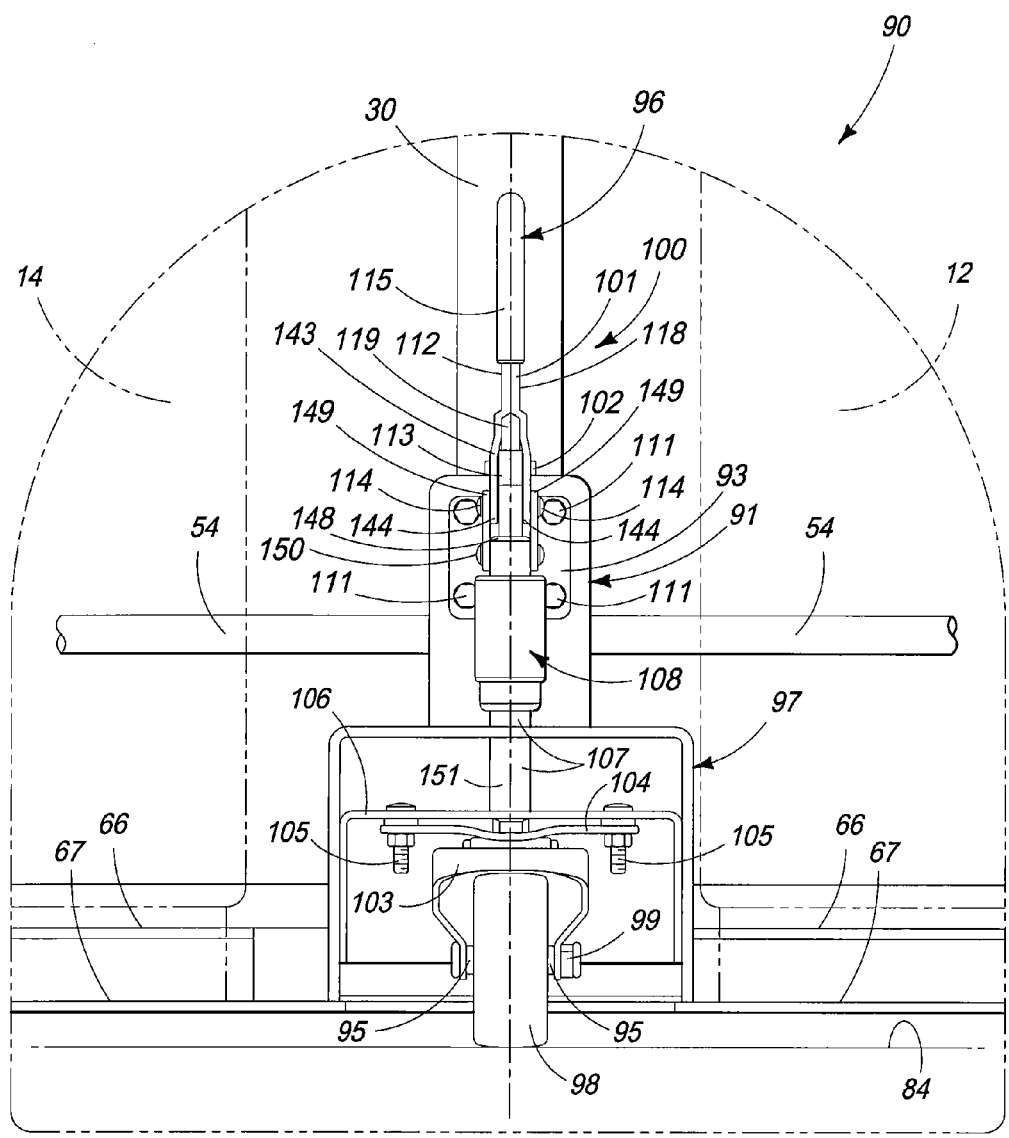
FIG. 9 is a partial front view of the exemplary article transport vehicle emphasizing a lift device in one position according to one of various embodiments of the invention.

Referring to FIGS. 7-8, an exemplary vehicle 10 is positioned to transport and deliver tanks 12 and 14. The lift device 90 is locked in the extended position, and therefore, front wheel 98 is locked elevationally below the support surface 18 against the substrate 84 with the support surface 18 spaced from the substrate 84. With this inventive configuration of vehicle 10, wheels 56 and front wheel 98 provide a three point wheel contact with substrate 84 (FIG. 8) in a spaced relation that provides substantial stability for moving vehicle 10 in any direction when a force is provided to handle structure 52. As stated previously, wing nut 42 can be reciprocally rotated in direction 43 (FIG. 8) to loosen, and alternatively tighten, locking bracket 40 against tanks 12 and 14.

With this inventive configuration of article transport vehicle 10, only a minimal amount of force is necessarily applied to handle structure 52 in reciprocal direction 20 (FIG. 7) to move vehicle 10 in reciprocal direction 86. The entire weight of vehicle 10 and article(s) is supported upon substrate 84 on its own without any force component provided by an individual. Accordingly, the weight of the article(s) provided on vehicle 10 is not a substantial consideration by an individual when determining the effort needed to move vehicle 10 to transport and deliver the article(s). Consequently, the inventive article transport vehicle 10 increases efficiency, mechanical advantage and ease of use which increases the number of articles capable of being transported by individuals. That is, increasing the efficiency, mechanical advantage and ease of use for article transport vehicle 10 increases the loads provided by articles that people are capable of transporting and delivering safely and efficiently.

Figure 10:
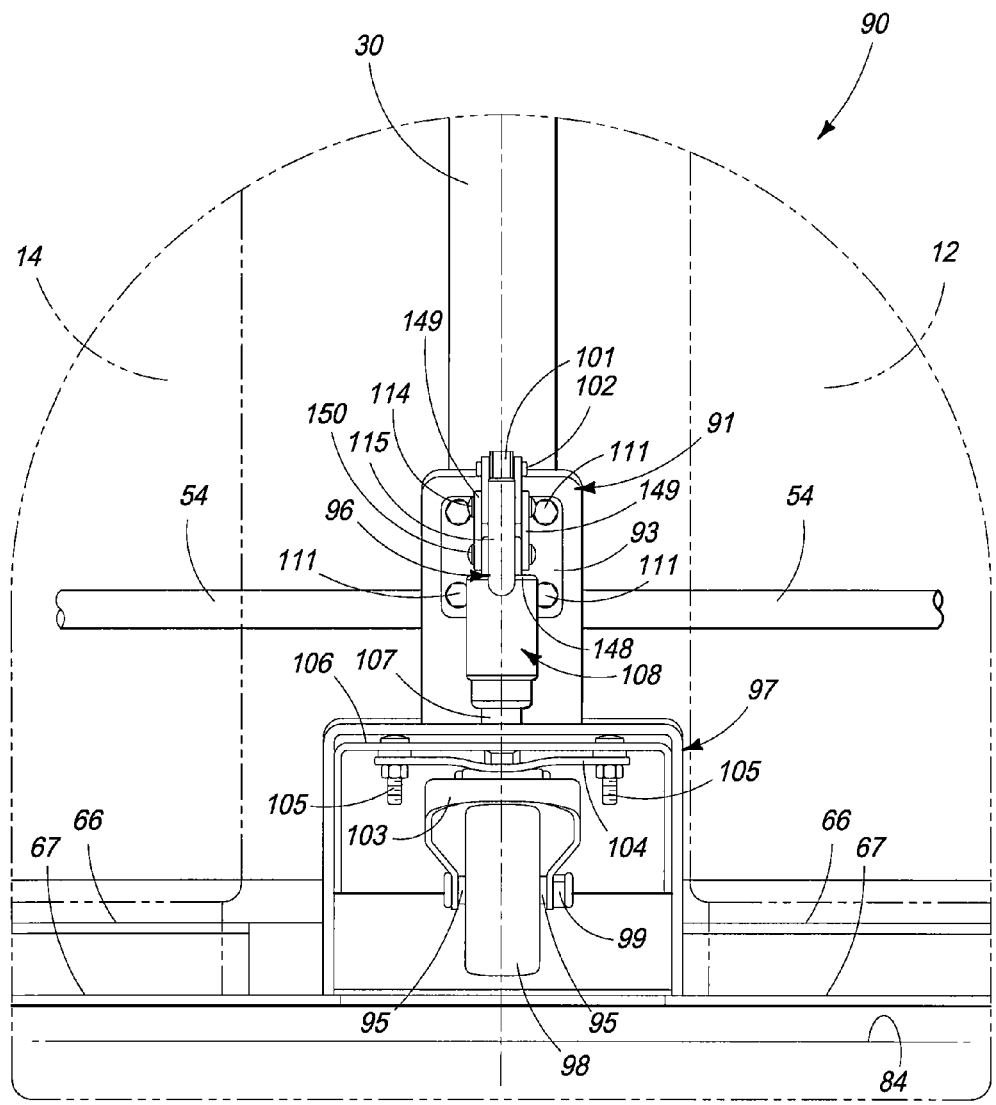
FIG. 10 is a partial front view of the exemplary article transport vehicle of FIG. 9 with the lift device in another position according to one of various embodiments of the invention.
Figure 11:
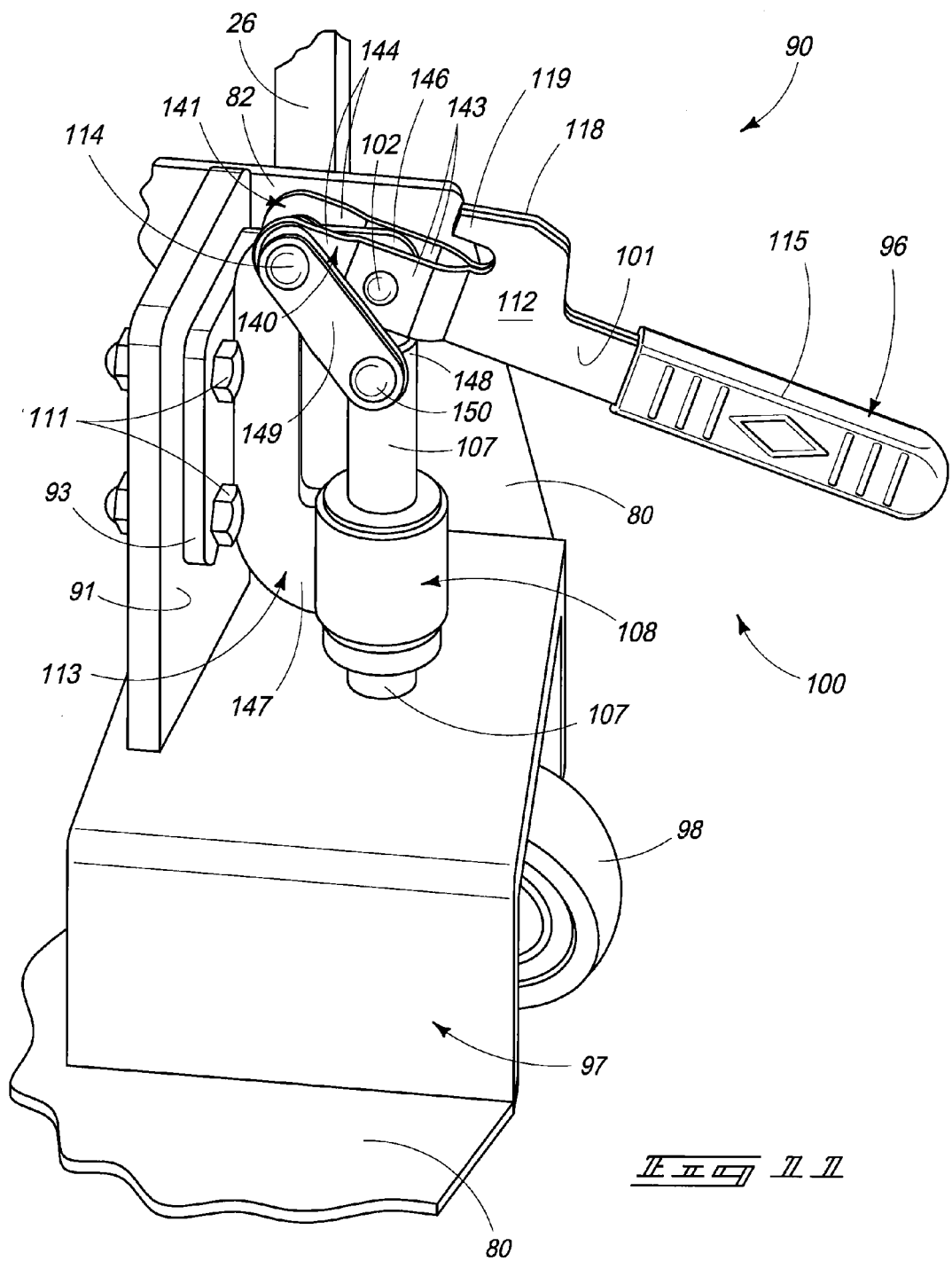
FIG. 11 is a partial perspective view of an exemplary lift device for an exemplary article transport vehicle emphasizing the linkage and structure for the lift device according to one of various embodiments of the invention.

Referring to FIGS. 9-12, a more detailed description for lift device 90 is presented with linkage 100 shown more thoroughly in FIG. 11. For one exemplary embodiment of lift device 90, the lift device 90 can be referred to as a plunger clamp wherein pivoting lever 96, through linkage 100, actuates the elongated plunger 107 to move along its longitudinal axis resulting in movement of the front wheel 98 between the axially locked-up position and locked-down position. The exemplary lever 96 is includes two similarly configured, generally linear, lever arm plates 112 and 118 positioned side by side. A first end of lever arm plates 112 and 118 are generally positioned against each other to receive (and/or be covered) by a grip 115. An exemplary composite of material for grip 115 is plastic and rubber materials such as polyethylene and polyvinyl chloride (PVC).

Still referring to FIGS. 9-12, and particularly FIG. 11, each lever arm plate 112 and 118 (hereinafter "arm plate(s)") includes an intermediate structure 101 that extends between respective first ends (grip 115) and opposite second ends 140 and 141 for respective arm plates 112 and 118. Second ends 140 and 141 of handle 96 are bifurcated to spread apart and position around portions of linkage 100 of lift device 90. For example, each second end 140 and 141 has a first portion 143 pivotably secured to a first end 146 of base 113 by a cross pin 102. An exemplary base 113 is a c-shaped link structure for securing linkage 100, plunger 107 and lever 96 ultimately to vehicle 10. The exemplary pivot at cross pin 102 is a stationary pivot meaning during the actuation of linkage 100 and lift device 90, cross pin 102 is stationary. Each second end 140 and 141 for respective arm plates 112 and 118 further include a second portion 144 extending from each first portion 143. Each second portion 144 is pivotably secured to an end of respective link arms 149 by respective pivot pins 114 for each arm plate 112 and 118. Each pivot pin 114 is non-stationary pivot and rotates about an axis represented by cross pin 102 and which is the same arc direction as reciprocal motion 110 (FIG. 12) for handle 96, but moves in the opposite arc direction from that which the handle 96 is pivoted or rotated.

Still referring to FIGS. 9-12, and particularly FIG. 11, each link arm 149 has an opposite end from respective pivot pins 114 and this opposite end is pivotably secured to an upper end 148 of plunger 107 (opposite front wheel 98) by cross pin 150. Plunger 107 slidingly engages a linear bearing 108 which is secured to a second end 147 of base 113 opposite first end 146. Base 113 is integral with, and/or secured to, securement plate 93. Securement plate 93 is secured to vertical plate 91 by bolt/nut combinations 111. Linear bearing 108 is slightly spaced elevationally above housing 97. Plunger 107 sliding engages linear bearing 108 to move axially along the longitudinal axis established by plunger 107. An opening in the top portion 109 (FIGS. 1 and 2) of housing 97 allows plunger to sliding engage and slide through housing 97 wherein an end 151 (FIG. 9) of plunger 107 is secured to sliding structure 106. A swivel bracket 104 is secured to sliding structure 106 by bolt/nut combinations 105. Swivel bracket 104 rotationally engages wheel bracket 103 to swivel or rotate about an axis generally defined by the longitudinal axis of plunger 107. Front wheel 98 is rotationally secured between arm extensions of wheel bracket 103 wherein axle 95 with axle head 99 rotatably secures front wheel 98 to the arm extensions of wheel bracket 103. For other exemplary embodiments of vehicle 10, front wheel 98 will not be able to swivel.

Figure 12:
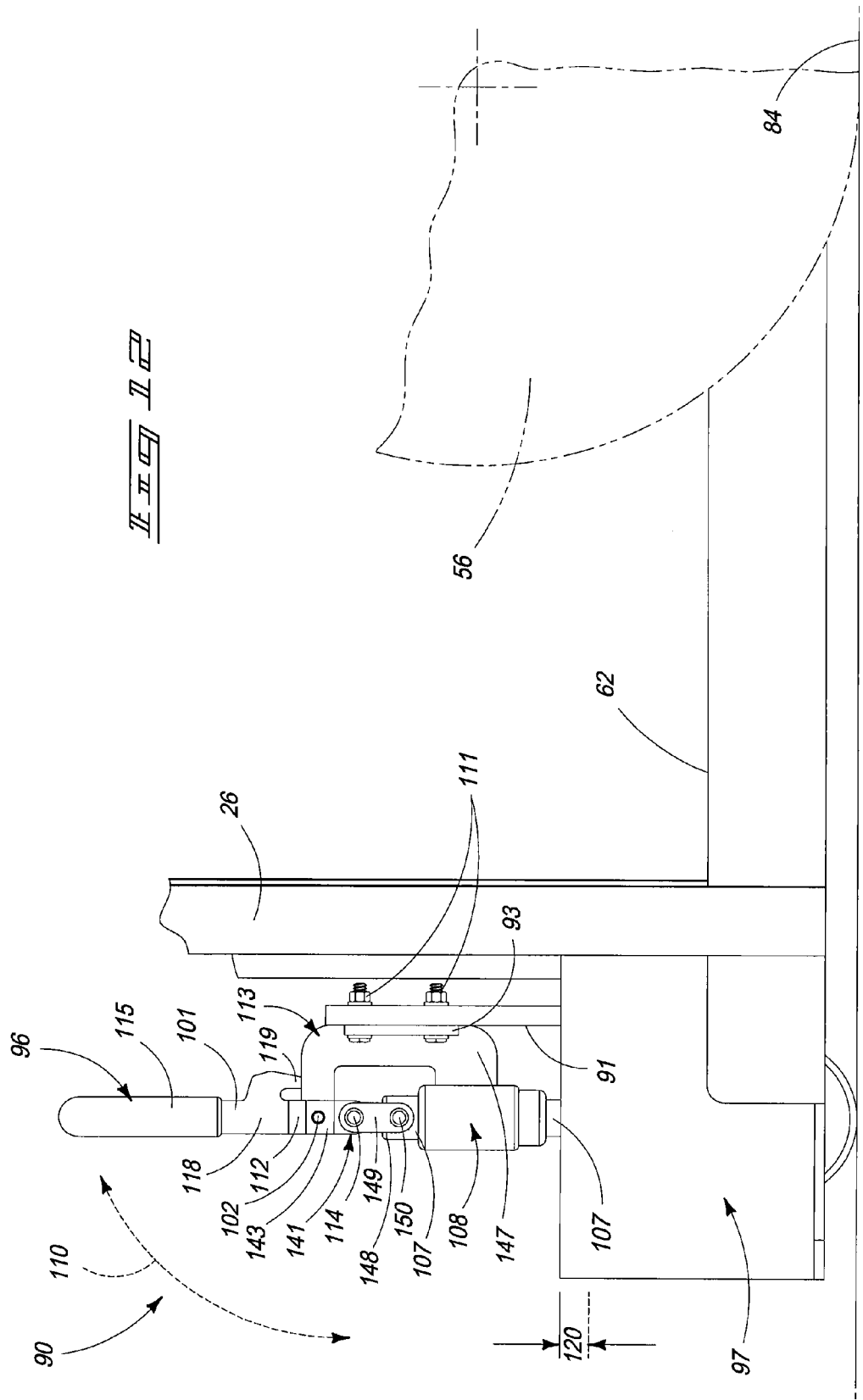
FIG. 12 is a partial side view of the lift device of FIG. 11 emphasizing the linkage and structure of the lift device in another position.

Still referring to FIGS. 9-12, and beginning with FIGS. 10 and 11, lift device 90 is shown in the retracted position. Referring to FIG. 12 and pivoting handle 96 to move through reciprocal motion 110, linkage 100 allows lift device 90 to be provided in the extended position. During the reciprocal motion 110 (FIG. 11), second portions 143 and 144 of second ends 140 and 141 (of arm plates 112 and 118) will move with respective pivot pins 114 beside portions of base 113 in the opposite arc direction of reciprocal motion 110 of handle 96. This motion of linkage 100 will drive link arm 149 to drive cross pin 150 and upper end 148 of plunger 107 downward toward linear bearing 108. This will result in front wheel 98 moving to engage the substrate 84 to lift or raise front portion of vehicle 10 at least approximately a distance of 120. An exemplary distance 120 can be a range from about 0.1 inch to about 12 inches, and any 0.1 of an inch in between the two outer limits of the range. Linkage 100 (for example, dimension of link arm 149) and/or plunger 107 and/or relative positions of front wheel 98 can be altered and changed to implement the different distances 120. The reciprocal motion 110 of handle 96 continues until linkage 100 locks lift device 90 and front wheel 98 in the extended position shown in FIGS. 9 and 12, and as shown in FIG. 12, stop 119 is resting upon first end 146 (FIG. 11) of base 113.

The following structural configurations described in this paragraph for exemplary article transport vehicles are applicable to all exemplary embodiments of vehicles described herein. It should be understood that for some exemplary embodiments of vehicle 10, front wheel 98 can be characterized as the lift device 100 alone. Accordingly, in this exemplary embodiment, the lever 96, linkage 100 and plunger 107 are separate and discrete structures from the lift device 90 and can collectively be characterized as a plunger clamp. Therefore, the front wheel 98 is the lift device 90 that is secured to the support surface 18 and capable of axial movement at an angle relative to the support surface 18 to selectively establish a raised position of the support surface 18 relative the substrate and to selectively establish a lowered position of the support surface relative the substrate. The raised position will correspond to when the plunger clamp (lever 96, linkage 100 and plunger 107) is in the extended position and the lowered position will correspond to when the plunger clamp is in the retracted position. Moreover, in this exemplary embodiment, the plunger clamp (lever 96, linkage 100 and plunger 107) provides the capability for the front wheel 98 (lift device 90) to be locked in the raised position, and alternatively, locked in the lowered position.

The following structural configurations described in this paragraph for exemplary article transport vehicles are applicable to all exemplary embodiments of vehicles described herein. For one exemplary embodiment of the vehicle, the plurality of tubular frame structures 26, 28, 34 and 50, attachment device 68, handle structure 52 and stabilizer bar 75 are hollow tubular structures having square cross-sections configurations. These tubular structures can all have the same cross-sectional dimensions, and alternatively, any one tubular structure can have a different cross-sectional dimension. Additionally, any combination of the tubular structures can have any different cross-sectional dimension relative to others of the tubular structures. In other exemplary embodiments of article transport vehicles, different cross-sectional configurations are possible for the exemplary tubular structures, for example, square, oval, circular, diamond or any other polygonal shape. Furthermore, any one of the tubular structures can have a different cross-sectional configuration, and alternatively, any combination of the tubular structures can have different cross-sectional configurations relative to others of the tubular structure configurations. Still further, other exemplary embodiments of article transport vehicles include cross-sectional configurations that are not hollow, for example, solid cross-sectional configurations. Moreover, any one of tubular frame structures 26, 28, 34 and 50, attachment device 68, handle structure 52 and stabilizer bar 75 can have a solid cross-sectional configuration, and alternatively, any combination of these structures can have solid cross-sectional configurations relative to others having hollow structural configurations.

The following structural configurations described in this paragraph for exemplary article transport vehicles are applicable to all exemplary embodiments of vehicles described herein. For one exemplary embodiment of the vehicle, includes the capability of having length dimensions selectively modified for the tubular frame structures 26, 28, 34 and 50, attachment device 68, handle structure 52 and stabilizer bar 75. For example, respective extensions 57 and 59 can be configured to have a length dimension that is selectively increased and/or selectively decreased. In this configuration, if an exemplary handle structure 52 of an embodiment of the vehicle needs additional length to accommodate a tall individual using the vehicle, the length of respective extensions 57 and 59 can be increased. A design to allow this capability is where the respective extensions 57 and 59 have respective telescopic configurations. That is, respective extensions 57 and 59 are each configured as having two distinct and separate tubular portions. One tubular portion is configured to slide inside the other tubular portion (and alternatively stated, the other tubular portion slides outside the one tubular portion). Additionally, each of the two tubular portions will have openings that can be aligned at the selected length for the respective extensions 57 and 59, and then a set pin is positioned in the two aligned openings to provide the two tubular portions in a fixed relationship. In this configuration, the length of respective extensions 57 and 59 can be increased or decreased as desired to facilitate use by the individual.

The following structural configurations described in this paragraph for exemplary article transport vehicles are applicable to all exemplary embodiments of vehicles described herein. For exemplary embodiments, the compositions of material for the structures include metals, plastics, thermoplastics, metal alloys and any combination thereof. Exemplary metals or similar material include tin, iron, aluminum, magnesium, zinc and copper, and alloys of any one metal or any combination of the metals. The metals or similar material can be characterized as being ductile and/or malleable. Being ductile and malleable allows for the metal or similar material to be molded into various forms and hardened. Still other exemplary structural compositions for article transport vehicles include alloys of metal such as steel, stainless steel, brass and bronze.

The following structural configurations described in this paragraph for exemplary article transport vehicles are applicable to all exemplary embodiments of vehicles described herein. For example, other compositions of material for the structures include plastics such as thermoplastics, thermosetting plastics and similar materials. These plastic materials can be characterized as being ductile and/or malleable which provides the capability of being molded into various forms and hardened. Furthermore, these plastic materials can be generally characterized by any of various nonmetallic compounds, synthetically produced, usually from organic compounds by polymerization, or formed into pliable sheets or films, fibers, flexible or hard foams. Example plastic materials include polystyrene, acrylonitrile butadiene styrene (ABS), polyamide, polypropylene, polyethylene, and polyvinyl chloride (PVC). Other exemplary nonmetallic compounds include spun glass or fiberglass which is a composite of extremely fine fibers of glass combined with polymers and epoxies.

The following structural configurations described in this paragraph for exemplary article transport vehicles are applicable to all exemplary embodiments of vehicles described herein. For exemplary embodiments, one exemplary method includes injection molding. Injection molding is a manufacturing process using thermoplastic and/or thermosetting plastic materials described previously (example plastic materials include polystyrene, acrylonitrile butadiene styrene (ABS), polyamide, polypropylene, polyethylene, and polyvinyl chloride (PVC)). An overview of an injection molding process includes molten plastic being injected at high pressure into a mold wherein the mold is an inverse design of the desired shape. Still other exemplary methods of forming exemplary embodiments of article transport vehicles include die casting. Die casting is a manufacturing process using metals and/or metal alloys described previously (example metals or metal alloys include tin, iron, aluminum, magnesium, zinc and copper, and alloys of any one metal or any combination of the metals). An overview of a die casting process includes molten metal being injected at high pressure into a mold wherein the mold is an inverse design of the desired shape of exemplary structural components of the vehicle. Yet other exemplary methods include: permanent mold casting, extrusion, forging, sand casting, powder metallurgy, ceramic mold casting, plaster mold casting and centrifugal casting.

The following structural configurations described in this paragraph for exemplary article transport vehicles are applicable to all exemplary embodiments of vehicles described herein. For exemplary embodiments, connections between respective separate structures can be provided by welding or pins, and any combination thereof. In one embodiment, any one of the tubular frame structures 26, 28, 34 and 50, attachment device 68, handle structure 52 and stabilizer bar 75 can be welded together in the appropriate configuration to form the vehicle. Still other embodiments, any one of the tubular frame structures 26, 28, 34 and 50, attachment device 68, handle structure 52 and stabilizer bar 75 can be provided together with pins, or any combination of pins and welds. For example, respective ends of tubular frame structures 26 and 34 are welded to respective containment ridges 62 and the other ends are attached to tubular frame structures 28 and 50, respectively, by pins 22 (see FIGS. 3-4).

Referring to FIGS. 13-16, an exemplary method 400 of transporting an article by using an exemplary article transport vehicle 10 is illustrated and described according to one of various embodiments of the invention. The exemplary method 400 is illustrated and described with respect to method steps 402-408 referred to in FIG. 22.

Figure 13:
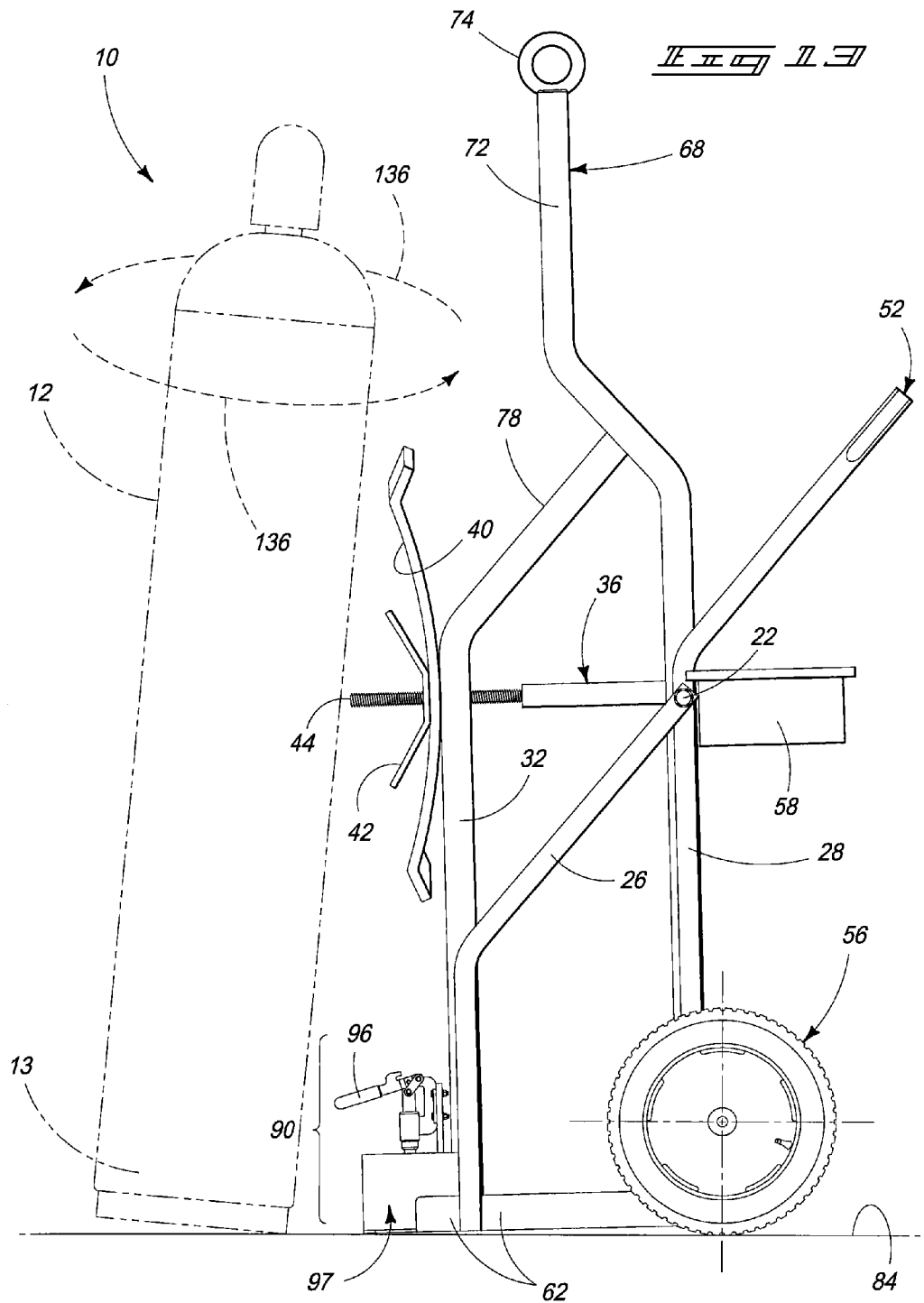
FIG. 13 is a view of an exemplary method step of using an exemplary article transport vehicle to transport an article according to one of various embodiments of the invention.

Referring to FIG. 13, method 400 includes a method step 402 (see FIG. 22) of providing a frame (structure subsequently described collectively represents an article transport vehicle 10). Frame (vehicle 10) includes a pair of wheels 56 supporting the frame on a substrate 84. The frame (vehicle 10) further includes an article surface 18 secured to, and extending outwardly from, the frame. The article surface 18 includes a front portion 80 spaced from the pair of wheels 56. The article surface 18 further includes a front wheel 98 rotatably secured to the front portion 80. The front wheel 98 is configured for movement relative the article surface 18 for lifting and lowering the article surface 18 relative the substrate 84.

Still referring to FIG. 13, another exemplary method step of method 400 not shown includes positioning the wing nut 42 and locking bracket 40 in a vertical orientation relative substrate 84 so to prevent impeding subsequent method step 404 of positioning the tank 12 onto the article surface 18. Still another exemplary method step of method 400 not shown includes providing the lift device 90 in the retracted position to lower and position the article surface 18 in generally the same plane as substrate 84 to allow for the subsequent method step 404 of positioning tank 12 onto the article surface 18. In the retracted position, lever 96 of lift device 90 is generally horizontal and parallel with substrate 84.

Figure 14:
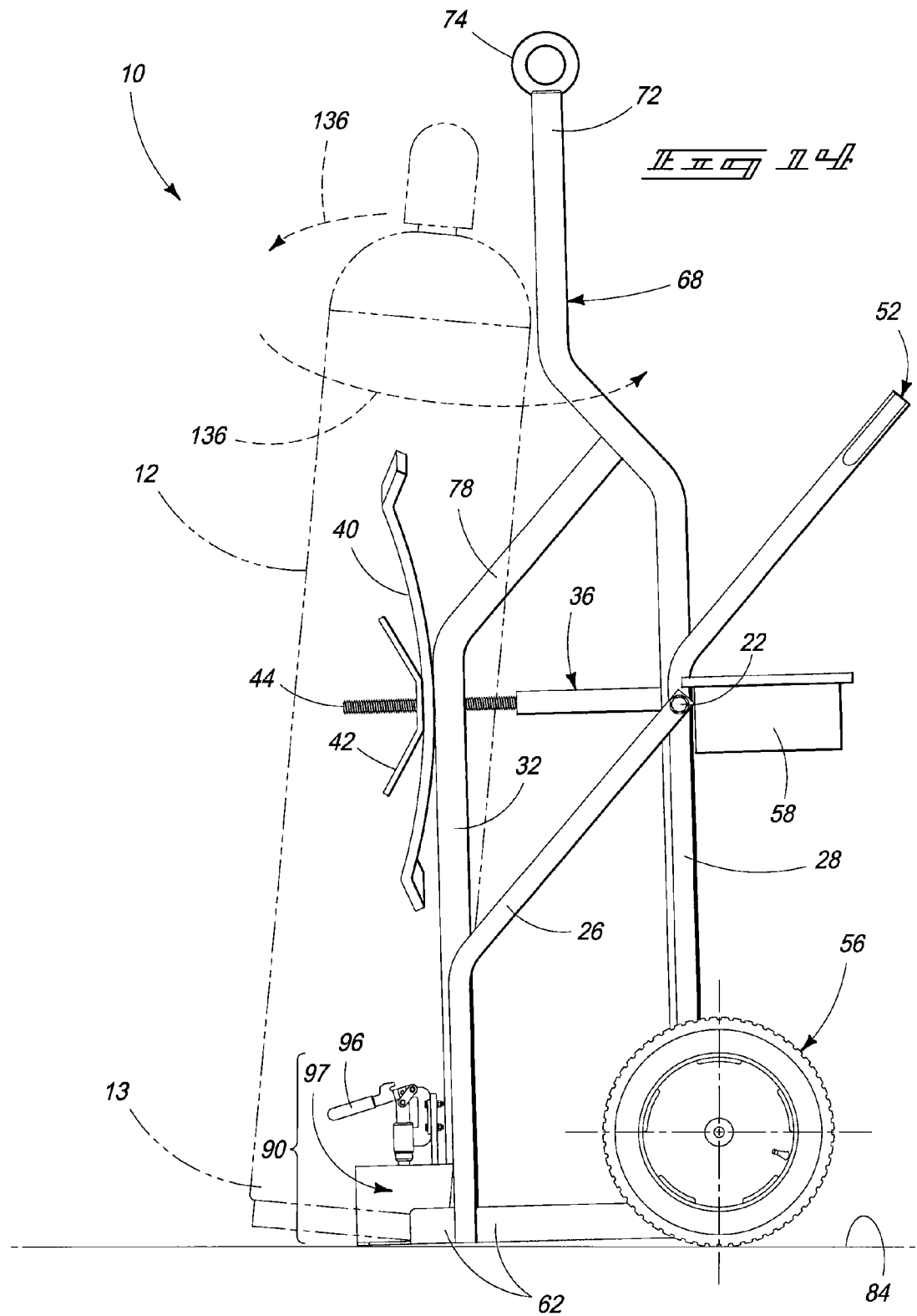
FIG. 14 is a view of an exemplary method step of using the exemplary article transport vehicle subsequent to the method step of FIG. 13.
Figure 15:
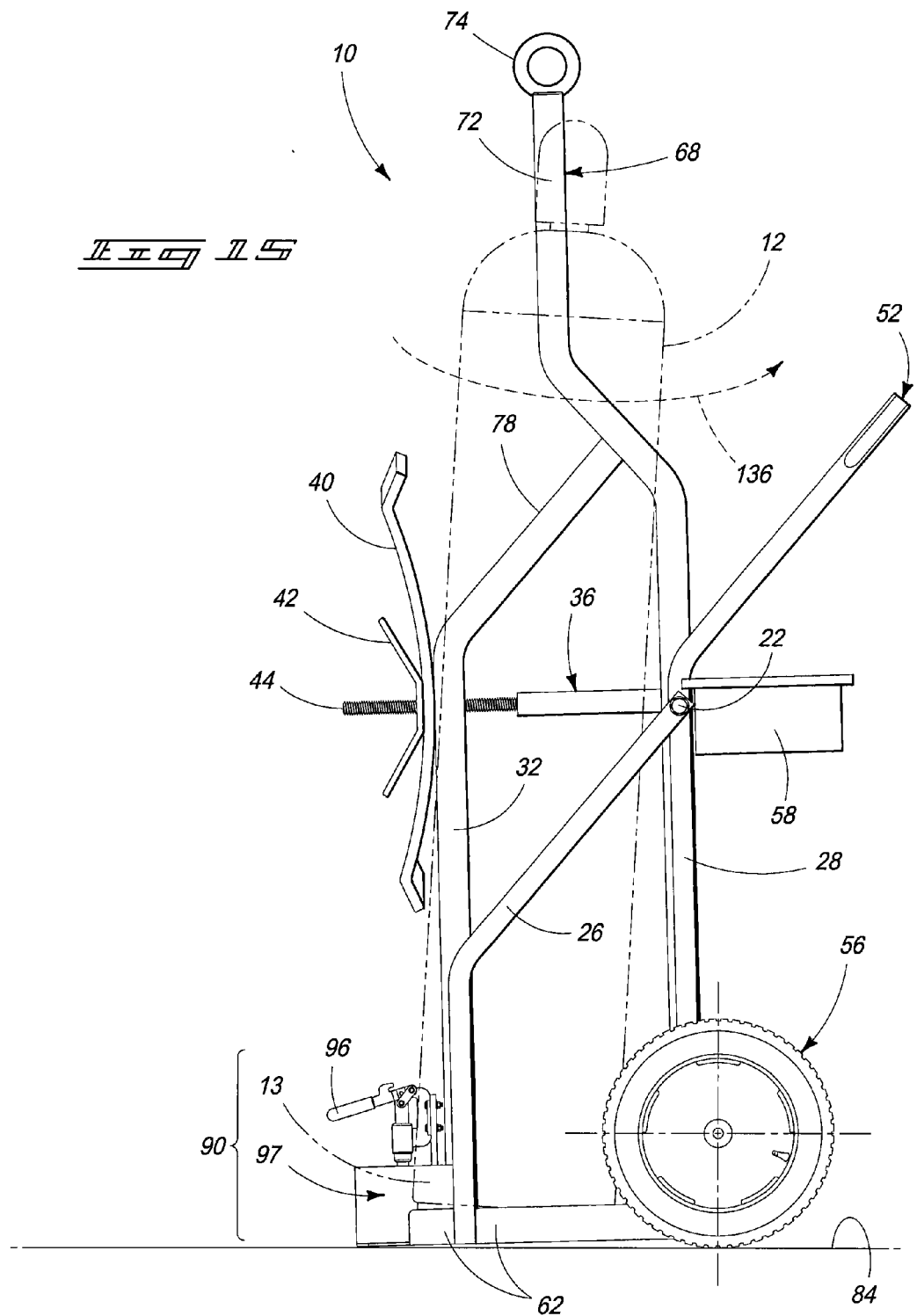
FIG. 15 is a view of an exemplary method step of using the exemplary article transport vehicle subsequent to the method step of FIG. 14.

Referring to FIGS. 13-15, method 400 includes a method step 404 (see FIG. 22) of positioning an article 12 on the article surface 18 (article surface 18 impeded from view by containment ridge 62). An exemplary article includes a fluid tank 12. Furthermore, an exemplary positioning includes rolling an end portion 13 of tank 12 in direction 136 along the substrate 84 until tank 12 reaches and rests upon article surface 18. Alternatively, another exemplary positioning method step includes carrying tank 12 over substrate 84 and placing the tank 12 upon the article surface 18 of the frame (vehicle 10). Still further, another exemplary positioning method step includes tilting tank 12 to raise a periphery edge or section of the end portion 13 of tank 12 off the substrate 84 and moving the article surface 18 to be positioned between the raised periphery edge of tank 12 and substrate 84. Next, lowering or dropping the periphery edge or section of the end portion 13 of tank 12 onto the article surface 18 of the frame (vehicle 10).

Figure 16:
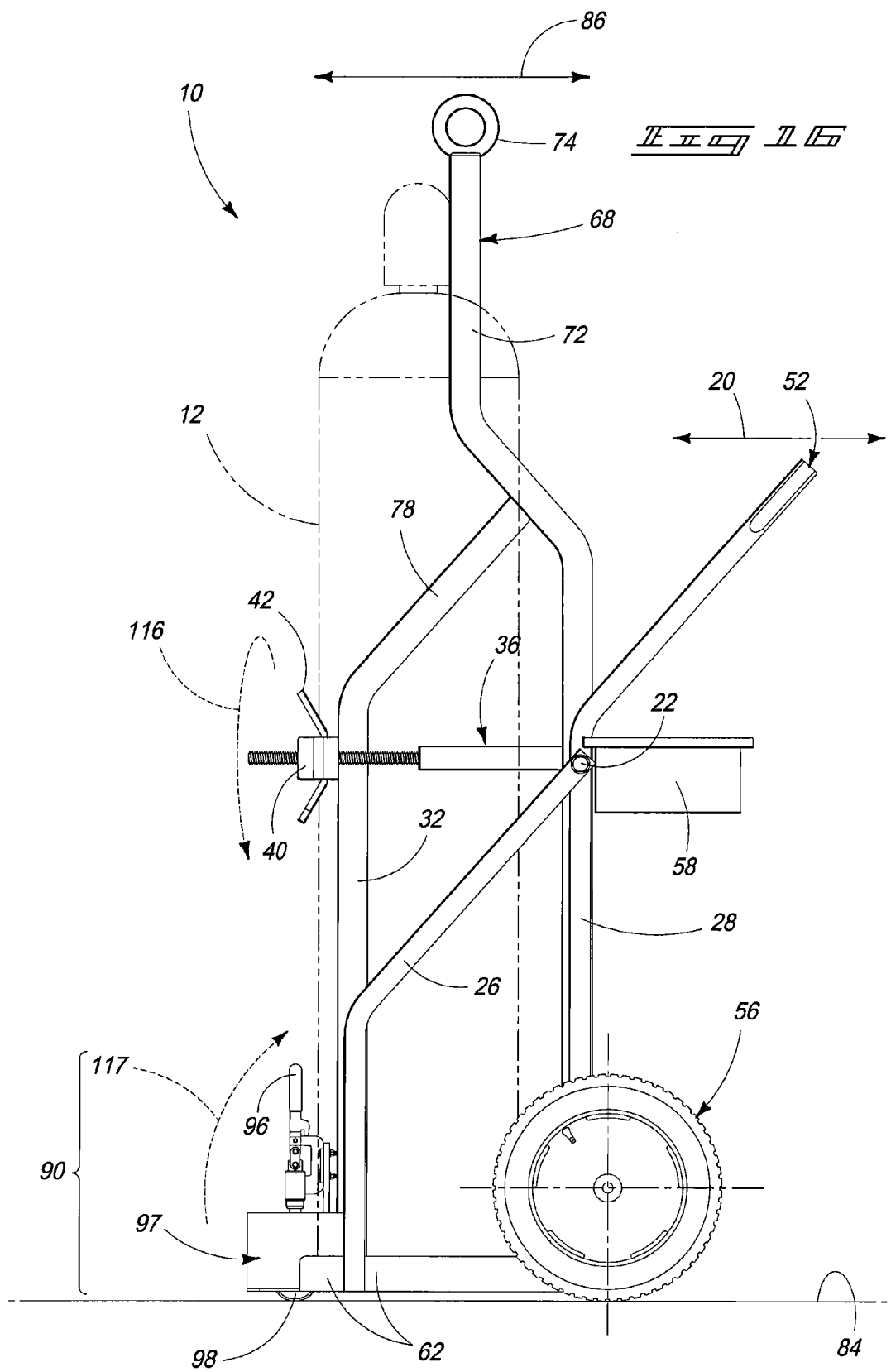
FIG. 16 is a view of an exemplary method step of using the exemplary article transport vehicle subsequent to the method step of FIG. 15.

Referring to FIG. 16, method 400 includes a method step 406 (see FIG. 22) of moving the front wheel 98 to lift the article surface 18 from contacting the substrate 84 and allowing the front wheel 98 to contact the substrate 84. An exemplary moving the front wheel 98 is provided by positioning the lift device 90 in the extended position wherein lever 96 is generally vertical and perpendicular to the substrate 84 and front wheel 98 contacts the substrate 84. Still referring to FIG. 16, another exemplary method step of method 400 not shown in FIG. 22 is rotating wing nut 42 in direction 116 to tighten locking bracket 40 against tank 12. It should be understood that an exemplary method 400 includes performing the step of moving the front wheel 98 before, or after, the rotating of the wing nut 42.

Still referring to FIG. 16, method 400 includes a method step 408 (see FIG. 22) of moving the frame (vehicle 10) with the article along the substrate 84. An exemplary method step 408 for moving vehicle 10 includes applying a minimal amount of force to handle structure 52 in either of reciprocal direction 20 which moves frame (vehicle 10) in either of reciprocal direction 86.

Figure 17:
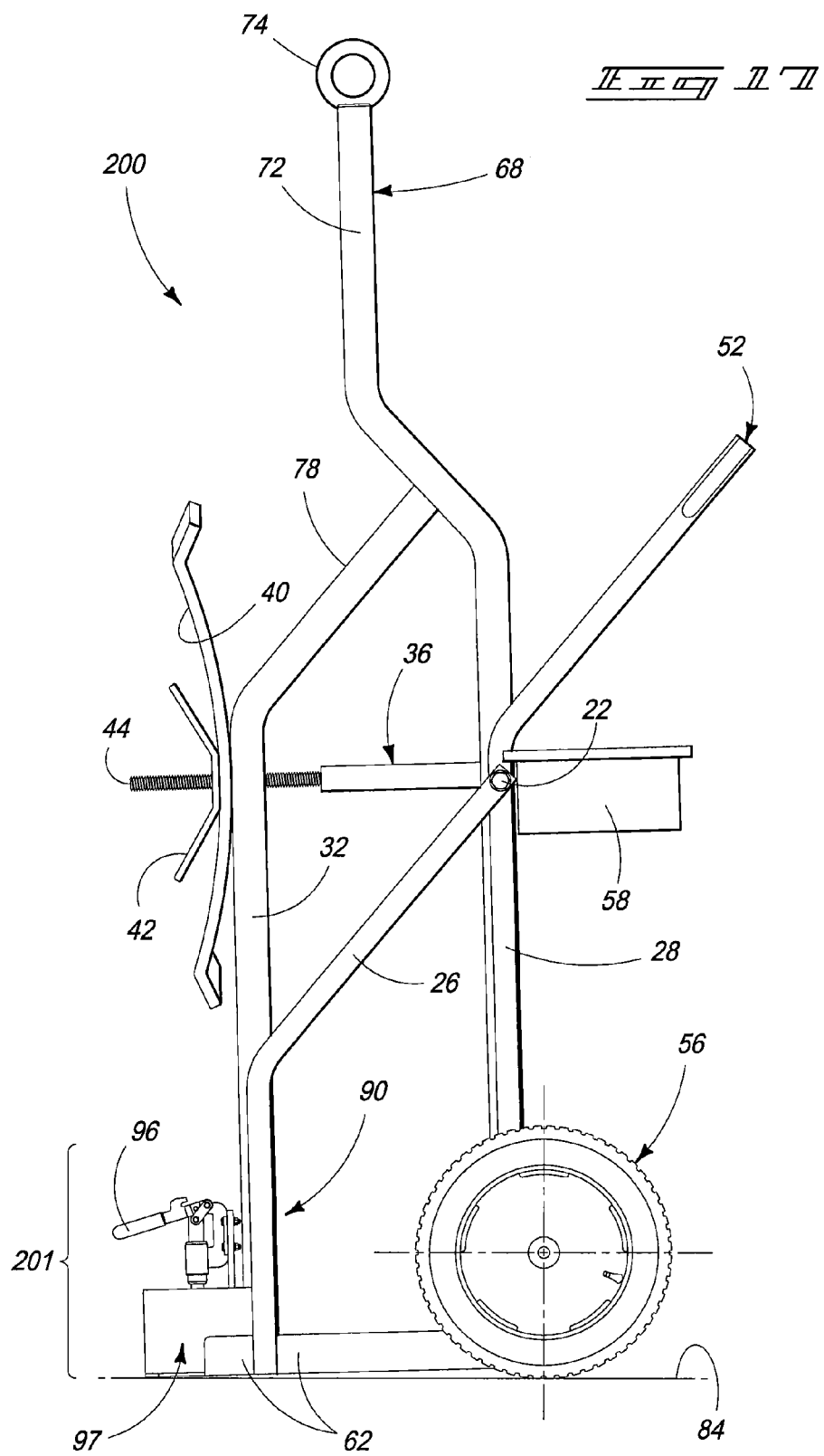
FIG. 17 is an elevational side view of an exemplary article transport vehicle according to another of various embodiments of the invention and illustrated in a configuration according to one of various embodiments of the invention.

Referring to FIG. 17, another exemplary article transport vehicle 200 (hereinafter referred to as "vehicle" or "vehicles") is illustrated according to another of various embodiments of the invention. Structures of vehicle 200 that have been described previously are referenced with the same number as previously used. An exemplary vehicle 200 includes a lift device 201 according one embodiment of the invention.

Figure 18:
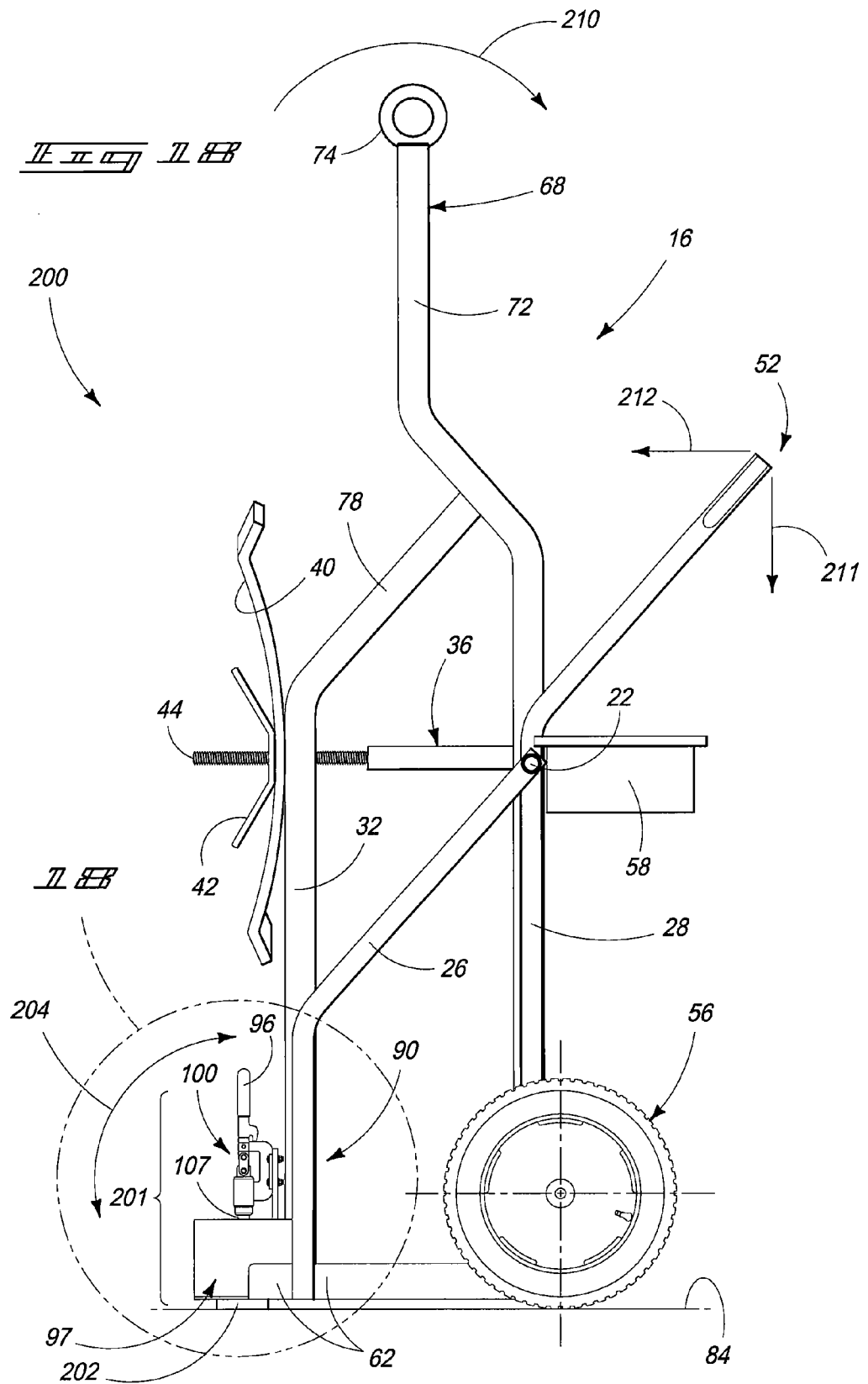
FIG. 18 is the elevational side view of the exemplary article transport vehicle of FIG. 17 and illustrated in a configuration different from the configuration of FIG. 17.

Referring to FIG. 18, an exemplary lift device 201 is devoid of a front wheel 98 disclosed in previously described lift devices and includes a pivot plate 202. Lift device 201 includes lever 96 that is capable of reciprocal motion 204 to move from the locked retracted position described previously to the locked extended position described previously. Reciprocal motion 204 of lever 96 actuates linkage 100 to drive or force axial movement of plunger 107.

Figure 19:
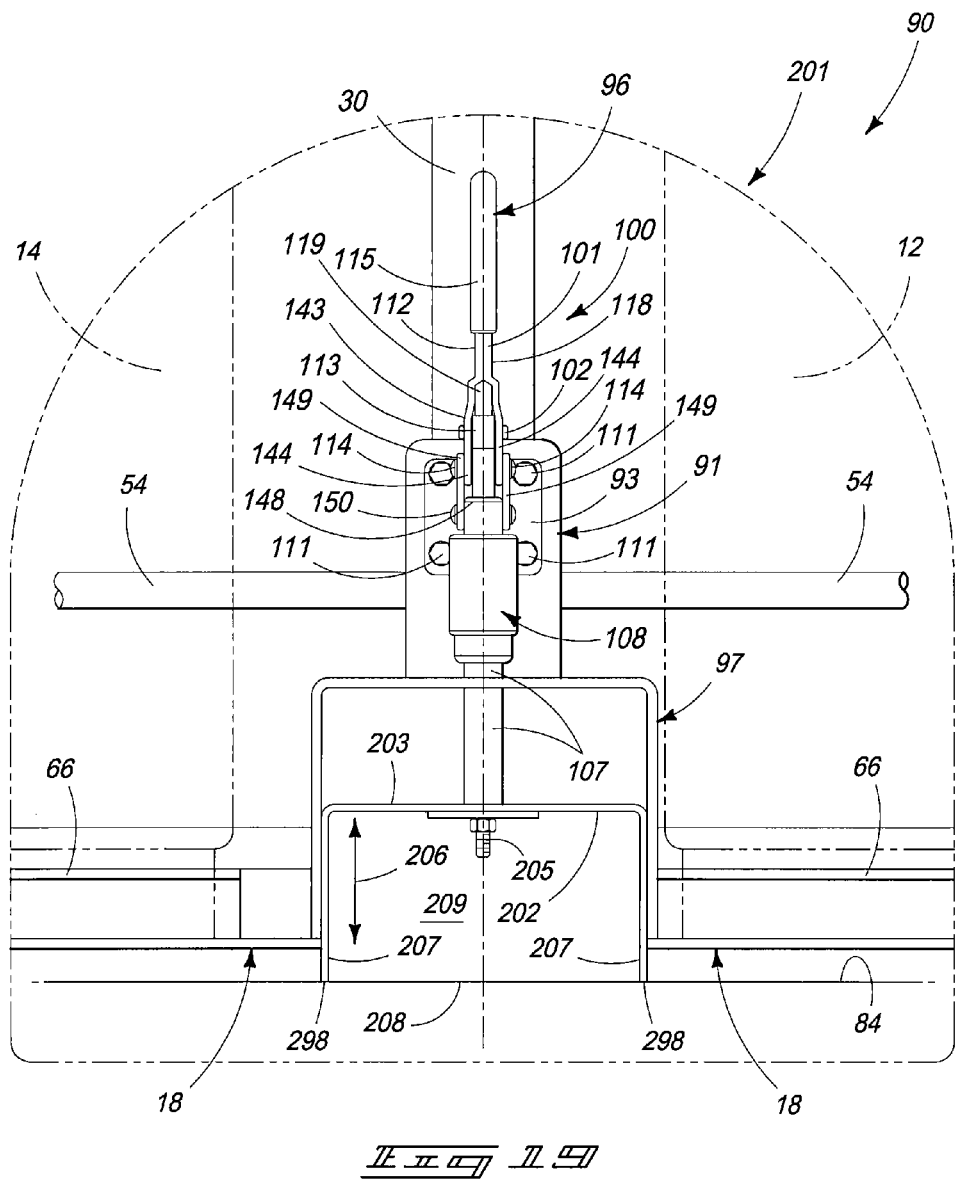
FIG. 19 is a partial front view of the exemplary lift device of FIG. 17 emphasizing the lift device according to another of various embodiments of the invention.

Referring to FIG. 19, an exemplary lift device 201 includes plunger 107 being secured to an upper wall 203 of the pivot plate 202 with a bolt/nut combination 205. Pivot plate 202 further includes a pair of opposite side walls 207 and a back wall 209 extending generally perpendicularly from upper wall 203. Back wall 209 additionally extends between the pair of side walls 207 wherein the side walls 207 and back wall 209 establish a c-shaped terminal edge 208 spaced from upper wall 203. The axial movement of plunger 107 moves the pivot plate 202 in axial, reciprocal movement 206 with the pair of side walls 207 sliding against or slightly spaced from inner walls of housing 97. Positioning lever 96 in the retracted position, terminal edge 208 is positioned elevationally above article surface 18 and article surface 18 is in the lowered position resting upon substrate 84.

Referring to FIGS. 18-19, positioning lever 96 in the extended position, terminal edge 208 is positioned elevationally below article surface 18 to rest upon substrate 84 and force or lift article surface 18 to be in the raised position elevationally above substrate 84. In this raised position, an exemplary vehicle 200 has frame 16 pivoted backward in direction 210 (see FIG. 18) on the pivot axis formed by axle 54 (see FIG. 18) of wheels 56. Further in the raised position, the plunger 107 and/or pivot plate 202 are dimensioned to pivot frame 16 in direction 210 to be proximate the center of gravity of vehicle 200 without tipping over backward. Accordingly, in this exemplary vehicle 200, only a slight or minimal downward force 211 on handle structure 52 moves the weight of the vehicle 200 past the center of gravity. Once vehicle 200 is past its center of gravity, vehicle 200 (and any article thereon) will rest in the hands of an individual under the weight of the vehicle 200 and a forward force 212 by the individual will begin to move the vehicle 200 forward.

With this inventive configuration, lift device 201 requires only a minimal force on handle 96 to move the weight distribution of article transport vehicle 200 to be balanced proximate the center of gravity. In contrast, prior art article transport vehicles require a substantial amount of force applied to an handle structure to move the prior art article transport vehicles past the center of gravity in anticipation of beginning to transport an article. By requiring only a slight or minimal downward force 211 on handle structure 52 to move vehicle 200 past the center of gravity, the inventive article transport vehicle 200 increases efficiency, mechanical advantage and ease of use which increases the number of articles capable of being transported by humans. That is, increasing the efficiency, mechanical advantage and ease of use for article transport vehicle 200 increases the loads of articles that people are capable of transporting and delivering safely and efficiently.

It should be understood that another exemplary embodiment of vehicle 200 can be devoid of threaded rod 44, locking bracket 40 and wing nut 42 since vehicle 200 is tilted over its center of gravity before moving forward with an article. That is, the article would be resting upon upper article brace 36 and lower article brace 64 under its own weight. It should be further understood, that any article transport vehicles described in this document could be devoid of threaded rod 44, locking bracket 40 and wing nut 42.

Referring to FIG. 20, still another exemplary article transport vehicle 500 is illustrated according to still another of various embodiments of the invention. The exemplary vehicle 500 includes the lower article brace 64 having only an upper guidance plate 66 without a lower guidance plate 67. Moreover, an exemplary vehicle 500 includes coverings 166 and 168 over respective upper guidance plates 66 and 38 of respective lower and upper article braces 64 and 36. The covering will protect an article, such as a tank, from damage while being positioned against the lower and upper article braces 64 and 36. An exemplary composite material for coverings 166 and 168 is plastic materials such as polyethylene and polyvinyl chloride (PVC) and/or a rubber compound.

Referring to FIG. 21, yet another exemplary article transport vehicle 600 is illustrated according to yet another of various embodiments of the invention. The exemplary vehicle 600 includes at least one side of locking bracket 40 having a covering 164. In the exemplary embodiment of vehicle 600 illustrated, the side of locking bracket 40 to be against or facing an article includes the covering 164. The covering will protect an article, such as a tank, from damage while being secured upon vehicle 600 by locking bracket 40. An exemplary composite material for covering 164 is plastic materials such as polyethylene and polyvinyl chloride (PVC) and/or a rubber compound.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An article transport vehicle comprising:
a frame comprising a pair of wheels rotatably secured to opposite sides of the frame;
an article surface extending laterally outward from the frame, the article surface comprising a front portion spaced from the frame;
a wall extending upwardly from the article surface and comprising an arcuate configuration to receive a cylindrical wall of a tank; and
a front wheel slidingly engaged with the front portion.

2. The vehicle of claim 1 further comprising:
a lever;
an elongated structure comprising an end opposite the lever and secured to the front wheel; and
linkage connected between the lever and the elongated structure, an entirety of the linkage comprised by a single structure and allows the lever to pivot and axially move the elongated structure.

3. The vehicle of claim 1 wherein the frame comprises a plurality of tubular structures, at least one tubular structure comprises a telescopic configuration comprising a first section capable of sliding into a second section with the second section surrounding an entirety of a periphery portion of the first section, the first and second sections provide the capability of selectively increasing or decreasing a length dimension of the at least one tubular structure.

4. The vehicle of claim 1 further comprising a handle secured to the frame, the handle comprising a telescopically configured tubular structure comprising a first section capable of sliding into a second section with the second section surrounding an entirety of a periphery portion of the first section, the first and second sections allowing the capability of selectively increasing or decreasing a length dimension of the handle.

5. The vehicle of claim 1 further comprising a receptacle secured to the frame, the receptacle is spaced elevationally above the article surface, the wall and the front wheel.

6. The vehicle of claim 5 wherein the receptacle comprises a range of depth of from about 1 inch to about 36 inches.

7. The vehicle of claim 5 wherein the receptacle comprises a lid.

8. The vehicle of claim 1 wherein the wall comprises a first wall, and further comprising a second wall spaced elevationally above the first wall, the second wall comprising an arcuate configuration.

9. A method of transporting an article, the method comprising:
providing a frame; a pair of wheels supporting the frame on a substrate; an article surface secured to, and extending outwardly from, the frame, a front wheel rotatably secured to the article surface and configured for axially movement along a line at an angle relative the article surface, the axial movement provides the capability to raise or lower the article surface relative the substrate;
positioning an article on the article surface;
axially moving the front wheel to raise the article surface from the substrate and allowing the front wheel to contact the substrate;
moving the frame along the substrate with the article; and
locking the article onto the article transport vehicle.

10. The method of claim 9 further comprising before the positioning, axially moving the front wheel to lower the article surface into contact with the substrate.

11. The method of claim 9 further comprising lifting or lowering the article transport vehicle above the substrate with a crane or a forklift.

* * * * *